US011265262B1

(12) United States Patent
Makie et al.

(10) Patent No.: US 11,265,262 B1
(45) Date of Patent: Mar. 1, 2022

(54) INFORMATION PROCESSING SYSTEM AND BURSTING CONTROL METHOD

(71) Applicant: HITACHI, LTD., Tokyo (JP)

(72) Inventors: Tatsuya Makie, Tokyo (JP); Tomohiro Morimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/411,990

(22) Filed: Aug. 25, 2021

(30) Foreign Application Priority Data

Jan. 6, 2021 (JP) .............................. JP2021-000900

(51) Int. Cl.
*G06F 15/173* (2006.01)
*H04L 47/762* (2022.01)
*H04L 47/78* (2022.01)
*H04L 67/1097* (2022.01)
*H04L 47/80* (2022.01)

(52) U.S. Cl.
CPC .......... *H04L 47/762* (2013.01); *H04L 47/782* (2013.01); *H04L 47/805* (2013.01); *H04L 47/808* (2013.01); *H04L 67/1097* (2013.01)

(58) Field of Classification Search
CPC ... H04L 47/762; H04L 47/782; H04L 47/805; H04L 47/808; H04L 67/1097
USPC ........................................ 709/223, 224, 226
See application file for complete search history.

(56) References Cited

U.S. PATENT DOCUMENTS

| 9,053,167 | B1* | 6/2015 | Swift | G06F 16/27 |
| 2004/0181469 | A1* | 9/2004 | Saeki | G06Q 40/12 |
| | | | | 705/30 |
| 2010/0131734 | A1* | 5/2010 | Clegg | G06F 9/44505 |
| | | | | 711/170 |
| 2013/0166727 | A1* | 6/2013 | Wright | G06F 3/0659 |
| | | | | 709/224 |
| 2014/0075030 | A1* | 3/2014 | Wang | H04L 41/30 |
| | | | | 709/226 |
| 2015/0081941 | A1* | 3/2015 | Brown | G06F 13/362 |
| | | | | 710/116 |
| 2016/0156568 | A1* | 6/2016 | Naganuma | G06F 16/21 |
| | | | | 709/226 |

FOREIGN PATENT DOCUMENTS

| JP | 2015-507268 A | 3/2015 |
| JP | 2015-535975 A | 12/2015 |
| JP | 2016-103113 A | 6/2016 |

OTHER PUBLICATIONS

Japanese Office Action dated Oct. 5, 2021 for Japanese Patent Application No. 2021-000900.

* cited by examiner

*Primary Examiner* — Liang Che A Wang
(74) *Attorney, Agent, or Firm* — Volpe Koenig

(57) ABSTRACT

An information processing system capable of controlling bursting more appropriately is provided. The information processing system includes: a credit management unit that manages a credit amount for controlling allocation of a resource amount of resources via the bursting with respect to each of a plurality of operation targets; and a bursting management unit that calculates the resource amount to be added via the bursting with respect to each of the plurality of operation targets according to the credit amount managed by the credit management unit and issues an instruction to a storage apparatus to allocate each calculated resource amount to each of the plurality of operation targets.

6 Claims, 19 Drawing Sheets

| OPERATION TARGET # | SET IOPS | CONVERSION COEFFICIENT |
|---|---|---|
| 0 | 1000 | 0.1 |
| 1 | 3000 | 0.1 |
| 2 | 2000 | 0.1 |

| OPERATION TARGET # | USER # |
|---|---|
| 0 | A |
| 1 | B |
| 2 | C |

| OPERATION TARGET # | TOTAL IOPS | SET IOPS | DIFFERENCE IOPS | CONVERSION COEFFICIENT | ACCUMULATED CREDIT AMOUNT | CONSUMED CREDIT AMOUNT |
|---|---|---|---|---|---|---|
| 0 | 1000 | 1000 | 0 | 0.01 | 0 | 0 |
| 1 | 4000 | 3000 | -1000 | 0.01 | 0 | 0 |
| 2 | 1500 | 2000 | 500 | 0.01 | 5 | 30 |

| USER # | CREDIT AMOUNT | ACCUMULATED CREDIT AMOUNT | CONSUMED CREDIT AMOUNT | CREDIT AMOUNT ONE SECOND LATER |
|---|---|---|---|---|
| A | 216000 | 0 | 0 | 216000 |
| B | 432000 | 0 | 0 | 432000 |
| C | 179950 | 50 | 0 | 180000 |

| BURSTING # | USER # | OPERATION TARGET # | STARTING DATE AND TIME | DURATION (SEC) | JOB MULTIPLICITY | ADDITIONAL REQUIRED CACHE CAPACITY /SECOND |
|---|---|---|---|---|---|---|
| 0 | A | 0 | 2020/1/1 01:00:00 | 10800 | 3 | 30 |
| 1 | B | 1 | 2020/1/1 02:00:00 | 7200 | 4 | 40 |
| 2 | C | 2 | 2020/1/1 03:00:00 | 7200 | 5 | 50 |

| BURSTING # | USER # | CREDIT AMOUNT ONE SECOND LATER | ADDITIONAL REQUIRED CACHE CAPACITY /SECOND ONE SECOND LATER | CREDIT AMOUNT RATE ONE SECOND LATER | ADDITIONAL ALLOCATED CACHE CAPACITY ONE SECOND LATER |
|---|---|---|---|---|---|
| 0 | A | 72000 | 30 | 2 | 6.66...(=50 x 2/(2+8+5)) |
| 1 | B | 288000 | 40 | 8 | 26.66...(=50 x 8/(2+8+5)) |
| 2 | C | 180000 | 50 | 5 | 16.66...(=50 x 5/(2+8+5)) |

Figures 9, 10:
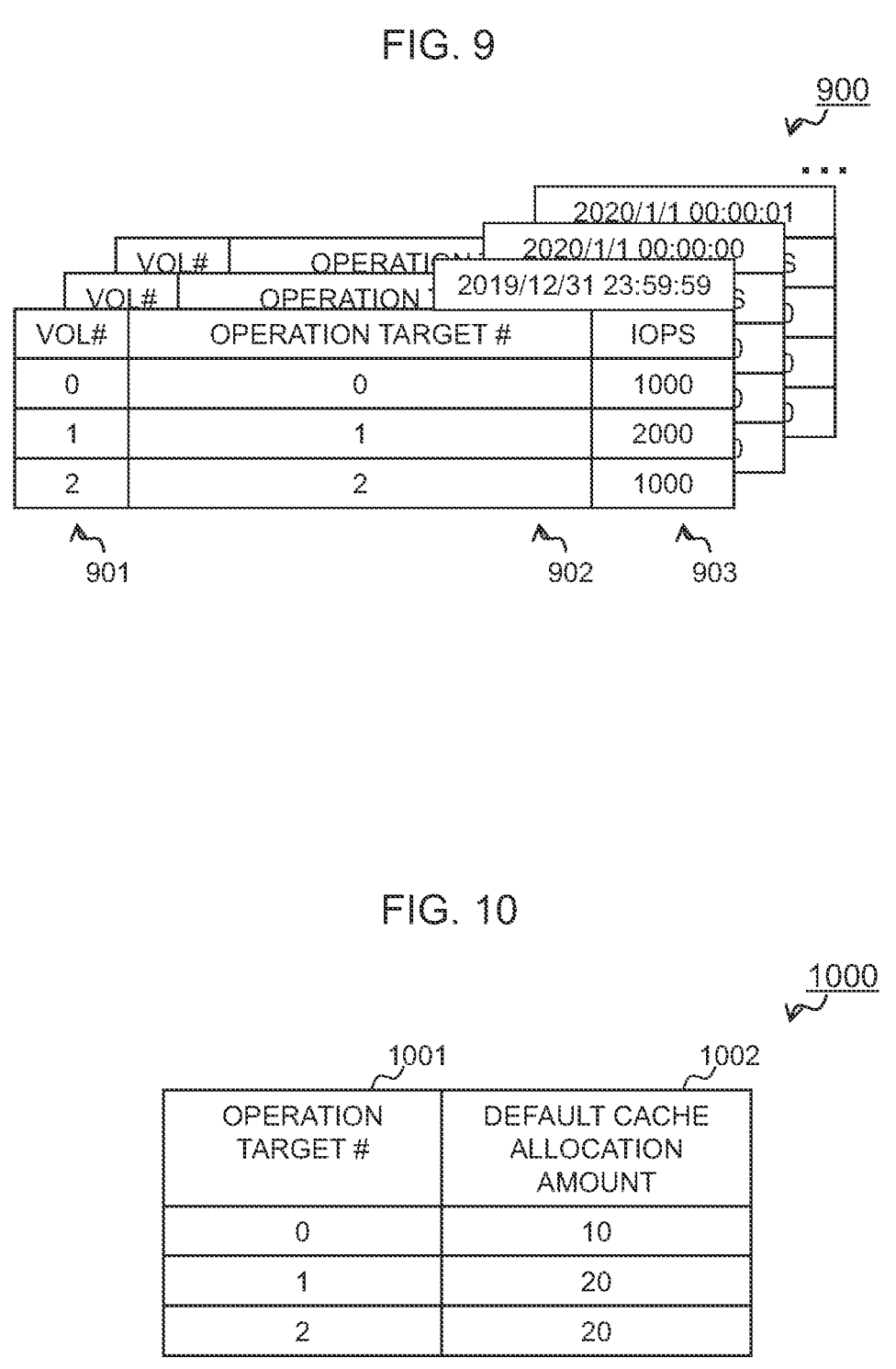

| VOL# | OPERATION TARGET # | IOPS |
|---|---|---|
| 0 | 0 | 1000 |
| 1 | 1 | 2000 |
| 2 | 2 | 1000 |

| OPERATION TARGET # | DEFAULT CACHE ALLOCATION AMOUNT |
|---|---|
| 0 | 10 |
| 1 | 20 |
| 2 | 20 |

| 1101 | 1102 | 1103 |
| --- | --- | --- |
| TOTAL CACHE CAPACITY | TOTAL DEFAULT CACHE ALLOCATION AMOUNT | DEFAULT FREE CACHE CAPACITY |
| 100 | 50 | 50 |

| OPERATION TARGET # | DEFAULT CACHE ALLOCATION AMOUNT | ADDITIONAL ALLOCATED CACHE CAPACITY | TOTAL ALLOCATED CACHE CAPACITY | ADDITIONAL ALLOCATED CACHE CAPACITY ONE SECOND LATER |
| --- | --- | --- | --- | --- |
| 0 | 10 | 30 | 40 | 30 |
| 1 | 20 | 0 | 20 | 0 |
| 2 | 20 | 0 | 20 | 0 |

[BURSTING REQUIREMENT INPUT SCREEN]

- JOB MULTIPLICITY : 3
- MAXIMUM IOPS PER JOB : 1000
- OPERATION TARGET # OF BURSTING TARGET : 0
- STARTING DATE AND TIME : 2020/01/01 01:00:00
- DURATION : 10800 SECONDS (= 3 HOURS)

FIG. 24

USER A'S CREDIT AMOUNT AT 04:00 ON 2020/1/1
48,000

2410

| DATE AND TIME | CREDIT AMOUNT | ACCUMULATED CREDIT AMOUNT | CONSUMED CREDIT AMOUNT |
|---|---|---|---|
| 2020/1/1 04:00~04:01 | 48000 | 0 | 0 |
| 2020/1/1 03:59~04:00 | 48400 | 0 | 400 |
| : | : | : | : |

USER A'S OPERATION TARGET # AND CONVERSION COEFFICIENT

2420

2020/1/1 03:58
2020/1/1 03:59
2020/1/1 04:00

| OPERATION TARGET # | DEFAULT CACHE ALLOCATION AMOUNT | CONVERSION COEFFICIENT |
|---|---|---|
| 0 | 10 | 0.01 |

2400

INFORMATION PROCESSING SYSTEM AND BURSTING CONTROL METHOD

TECHNICAL FIELD

The present invention generally relates to bursting control.

BACKGROUND ART

There has conventionally been a service for a plurality of users to share and use a storage environment composed of one or more storage apparatuses (multi-tenant-type storage service). Regarding the multi-tenant-type storage service, an upper limit is often set to a resource amount of resources which can be used by each user in order to secure the performance required by each user. The resources are, for example, ports, processors, caches, disks, and so on of the storage apparatus(es).

However, since the plurality of users share the storage apparatus(es), the storage apparatus(es) sometimes temporarily receives a high access volume. When this happens, the storage apparatus(es) processes the high access volume by temporarily scaling out the resource amount allocated to the users. In the following explanation, if the demand cannot be satisfied with a previously allocated resource amount, to additionally dynamically allocate a resource amount will be described as "bursting."

With this regard, there is disclosed a technology that enhances the performance of a tenant by scaling up DV servers which have followed the scale-out of web servers (see PTL 1).

CITATION LIST

Patent Literature

PTL 1: Japanese Patent Application Laid-Open (Kokai) Publication No. 2016-103113

SUMMARY OF THE INVENTION

Problems to be Solved by the Invention

However, with the technology described in PTL 1, if the plurality of users demand bursting and if the bursting which is firstly started results in occupying resources, this causes an inconvenience for other users incapable of conducting bursting until that bursting terminates.

The present invention was devised in consideration of the above-described circumstance and aims at proposing, for example, an information processing system capable of controlling the bursting more appropriately.

Means to Solve the Problems

In order to solve the above-described problem, there is provided according to an aspect of the present invention an information processing system for performing bursting with respect to a storage apparatus which is coupled to a plurality of operation targets including one or more hosts and processes reading and writing of data by the one or more hosts, to additionally allocate a resource amount of a specified resource for the storage apparatus relating to the processing, wherein the information processing system includes: a credit management unit that manages a credit amount for controlling allocation of the resource amount of the resource via the bursting with respect to each of the plurality of operation targets; and a bursting management unit that calculates the resource amount to be added via the bursting with respect to each of the plurality of operation targets according to the credit amount managed by the credit management unit and issues an instruction to the storage apparatus to allocate each calculated resource amount to each of the plurality of operation targets.

With the above-described configuration, for example, when the plurality of operation targets demand an additional resource amount, the additional resource amount is allocated according to the credit amount. So, for example, it is possible to avoid the situation where an operation target which demands the bursting first may occupy the resources.

Advantageous Effects of the Invention

The bursting can be controlled more appropriately according to the present invention.

BRIEF DESCRIPTION OF DRAWINGS

FIG. 3 is a diagram illustrating an example of credit setting information according to the first embodiment;

FIG. 4 is a diagram illustrating an example of user information according to the first embodiment;

FIG. 5 is a diagram illustrating an example of operation target credit amount information according to the first embodiment;

FIG. 6 is a diagram illustrating an example of user credit amount information according to the first embodiment;

FIG. 7 is a diagram illustrating an example of bursting requirement information according to the first embodiment;

FIG. 8 is a diagram illustrating an example of bursting management information according to the first embodiment;

FIG. 9 is a diagram illustrating an example of VOL status information according to the first embodiment;

FIG. 10 is a diagram illustrating an example of cache management information according to the first embodiment;

FIG. 11 is a diagram illustrating an example of cache status information according to the first embodiment;

FIG. 12 is a diagram illustrating an example of cache allocation information according to the first embodiment;

FIG. 18 is a diagram illustrating an example of a screen according to the first embodiment;

FIG. 24 is a diagram illustrating an example of a screen according to the first embodiment.

DESCRIPTION OF EMBODIMENTS (I) First Embodiment

Figure 1:
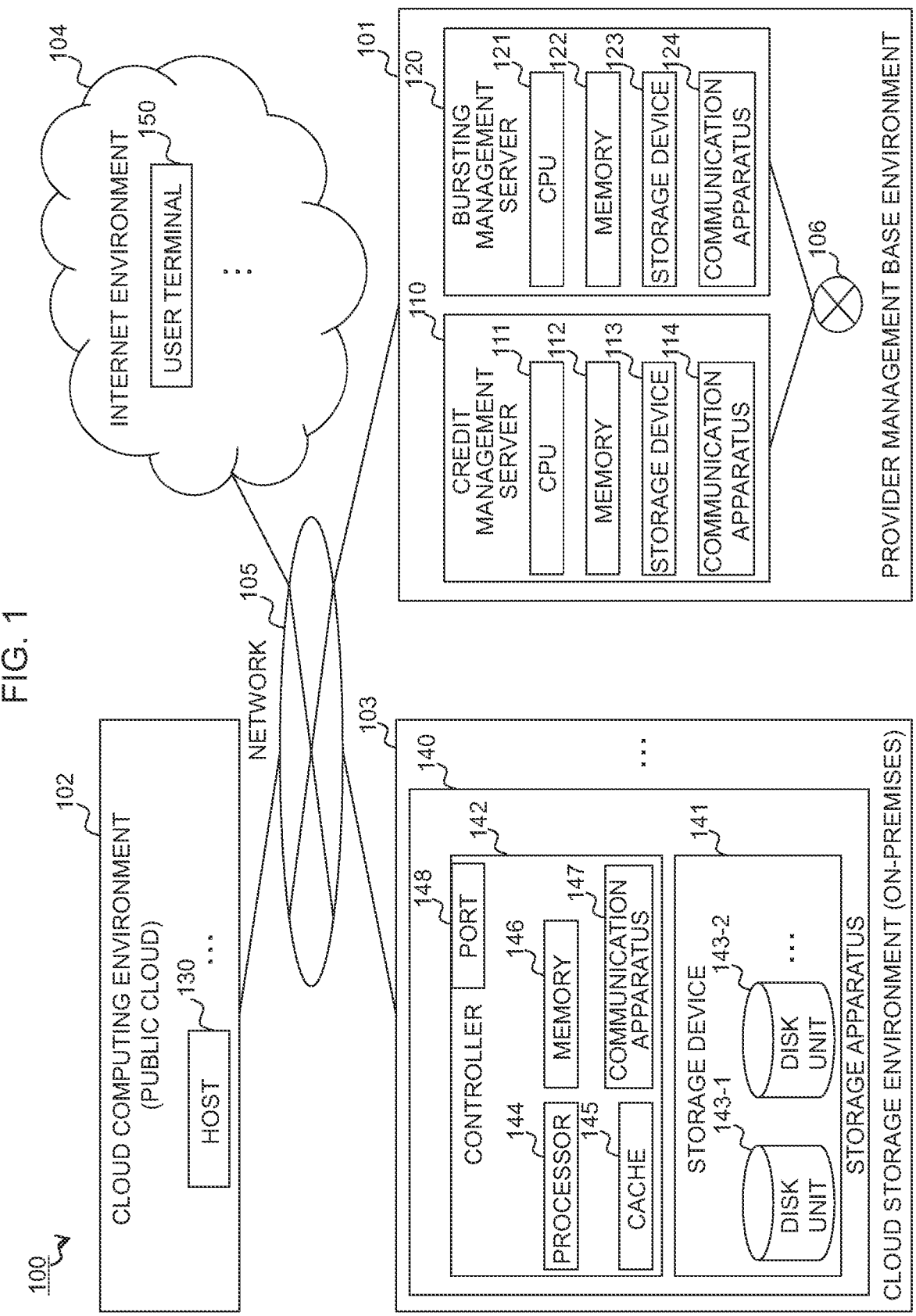
FIG. 1 is a diagram illustrating an example of a hardware configuration of an information processing system according to a first embodiment.

An embodiment of the present invention will be explained below in detail. However, the present invention is not limited to the embodiment.

In an information processing system according to this embodiment, for example, a credit amount is used as an index for controlling a resource amount of resources for a storage apparatus. This information processing system manages the credit amount in accordance with each user's operational results and controls the resource amount to be additionally allocated upon bursting on the basis of the credit amount. For example, this information processing system uses, as the operational results, an IOPS (Input Output Per Second) of volumes configured of storage areas provided by the storage apparatus and monitors the difference between the above-mentioned IOPS and a preset IOPS. This information processing system adds a credit amount, which is calculated by multiplying the IOPS by a preset conversion coefficient and converting the IOPS into a resource-amount-based value, to an accumulated credit amount. Moreover, for example, this information processing system subtracts a credit amount, which is calculated by multiplying the resource amount added upon bursting by bursting time, from the accumulated credit amount. Furthermore, this information processing system acquires an additional resource amount required for each bursting in advance. Then, this information processing system calculates the resource amount to be additionally allocated by proportionally dividing a free resource amount by a ratio of the respective users' credit amounts with respect to each time slot and the storage apparatus allocates the calculated resource amount.

According to the above-described configuration, the resource amount can be reasonably allocated by using a quantitative index attributable to the user(s) even if a plurality of users demand bursting and shortage of the resource amount is predicted.

Next, the embodiment of the present invention will be explained with reference to the drawings. The following description and the drawings illustrate examples in order to explain the present invention and some omissions and simplification are made as appropriate for the purpose of clarification of the explanation. The present invention can be implemented in other various forms. Unless specifically limited, each constituent element may be either singular or plural.

Incidentally, in the following explanation, the same number will be assigned to the same elements in the drawings and an explanation about them will be omitted as necessary. Furthermore, when explaining elements of the same type without distinguishing them each other, a common part (the part excluding a branch number) of the reference numeral including the branch number is used; and when explaining the elements of the same type by distinguishing them each other, the reference numerals including the branch numbers may sometimes be used. For example, when explaining hosts without particularly distinguishing them each other, they will be described as "hosts 130"; and when explaining the hosts by individually distinguishing them each other, they may sometimes be described as a "host 130-1" and a "host 130-2." Furthermore, the number may be sometimes indicated as "#."

The expressions "first," "second," "third," and so on in, for example, this description are attached to identify constituent elements and do not necessarily limit the quantity or the sequential order. Also, the numbers for identifying the constituent elements are used in each context; and the numbers used in one context do not necessarily indicate the same configuration in other contexts. Furthermore, this does not preclude a constituent element identified with a certain number from also having functions of constituent elements identified with other numbers.

FIG. 1 is a diagram illustrating an example of a hardware configuration of an information processing system 100.

The information processing system 100 is a cloud system that is a combination of a credit management server 110 and a bursting management server 120 which are provide in a provider management base environment 101, a host 130 provided in a cloud computing environment 102, a storage apparatus 140 provided in a cloud storage environment 103, and a user terminal 150 provided in an Internet environment 104.

In the information processing system 100, the credit management server 110 is coupled to the storage apparatus 140 and the user terminal 150 via a network 105. The bursting management server 120 is coupled to the storage apparatus 140 and the user terminal 150 via the network 105. The host 130 is coupled to the storage apparatus 140 via the network 105. The credit management server 110 and the bursting management server 120 are coupled to each other via an internal network 106.

The credit management server 110 is a computer for executing various kinds of information processing and, for example, manages the credit amount on the basis of information of the storage apparatus 140. The credit management server 110 includes, as its constituent elements, a CPU (Central Processing Unit) 111, a memory 112, a storage device 113, and a communication apparatus 114.

The CPU 111 is an apparatus for executing arithmetic operation processing. The CPU 111 may be, for example, an MPU (Micro Processing Unit), a GPU (Graphics Processing Unit), or an AI (Artificial Intelligence) chip.

The memory 112 is an apparatus for storing programs, data, and so on. The memory 112 is, for example, a ROM (Read Only Memory), a RAM (Random Access Memory), and so on. The ROM is an SRAM (Static Random Access Memory), an NVRAM (Non-Volatile RAM), a mask ROM (Mask Read Only Memory), a PROM (Programmable ROM), and so on. The RAM is a DRAM (Dynamic Random Access Memory) and so on.

The storage device 113 is a hard disk drive, a flash memory, an SSD (Solid State Drive), an optical storage device, and so on. The optical storage device is a CD (Compact Disc), a DVD (Digital Versatile Disc), and so on. The programs, data, and so on which are stored in the storage device 113 are read to the memory 112 from time to time.

The communication apparatus 114 is a communication interface for communicating with other apparatuses via a communication medium. The communication apparatus 114 is, for example, an NIC (Network Interface Card), a wireless communication module, a USB (Universal Serial Interface) module, and a serial communication module. The communication apparatus 114 can also function as an input device for receiving information from other apparatuses coupled thereto so that they can communicate with each other. Furthermore, the communication apparatus 114 can also function as an output device for transmitting information to other apparatuses coupled thereto so that they can communicate with each other.

Incidentally, the credit management server 110 may include an input device and an output device. The input device is a user interface which accepts information from a user. The input device is, for example, a keyboard, a mouse, a card reader, and a touch panel. The output device is a user interface which outputs various kinds of information (such as display outputs, sound outputs, and print outputs). The output device is, for example, a display device, a sound output device (a speaker), a printer, and so on for visualizing various kinds of information. The display device is, for example, an LCD (Liquid Crystal Display) and a graphic card.

However, the credit management server 110 may be a general-purpose server apparatus or a virtual machine embodied by a virtual program mounted in the general-purpose server apparatus.

The bursting management server 120 is a computer for executing various kinds of information processing and manages (controls) bursting based on, for example, information of the credit management server 110 and information of the storage apparatus 140. The bursting management server 120 includes, as constituent elements, a CPU 121, a memory 122, a storage device 123, and a communication apparatus 124. The constituent elements of the bursting management server 120 may be the same as those of the credit management server 110 and an explanation about them has been omitted. Incidentally, the bursting management server 120 may be a general-purpose server apparatus or a virtual machine embodied by a virtual program mounted in the general-purpose server apparatus.

The host 130 is a computer equipped with information processing resources such as a CPU and a memory and is configured of, for example, a general-purpose server apparatus. However, the host 130 may be a virtual machine embodied by a virtual program mounted in the general-purpose server apparatus. Specified application software is mounted in the host 130. The host 130 executes specified arithmetic operation processing based on the application software and reads/writes necessary data from/to the storage apparatus 140 in the cloud storage environment 103 via the network 105.

The storage apparatus 140 includes a storage device 141 and a controller 142 for controlling reading/writing of data from/to the storage device 141.

The storage device 141 includes a disk unit 143 such as a hard disk unit, an SSD, or a flash memory.

The controller 142 includes a processor 144, a cache 145, a memory 146, a communication apparatus 147, and a port(s) 148. The processor 144 is a device for controlling reading/writing of data from/to the storage device 141 according to an I/O command from the host 130. The cache 145 is configured of a semiconductor memory and is used to temporarily retain data to be read/written from/to the storage device 141. The memory 146 stores programs, data, and so on which are used by the processor 144. The communication apparatus 147 is configured of an NIC or the like and conducts protocol control during communication with the host 130 via the network 105. The communication between the host 130 and the communication apparatus 147 is performed via a port 148 allocated to the host 130, among a plurality of ports 148 provided in the controller 142.

The user terminal 150 is a computer equipped with information processing resources such as a CPU, a memory, and so on and is, for example, a notebook personal computer, a tablet, or the like. The user terminal 150 communicates with the credit management server 110, the bursting management server 120, the host 130, etc. via the network 105. For example, the user terminal 150 sends an inquiry to the credit management server 110 about the current credit amount according to an instruction from the user and displays the inquiry result. Moreover, for example, the user terminal 150 accepts input of information indicating bursting requirements from the user and transmits the accepted information to the bursting management server 120.

Figure 2:
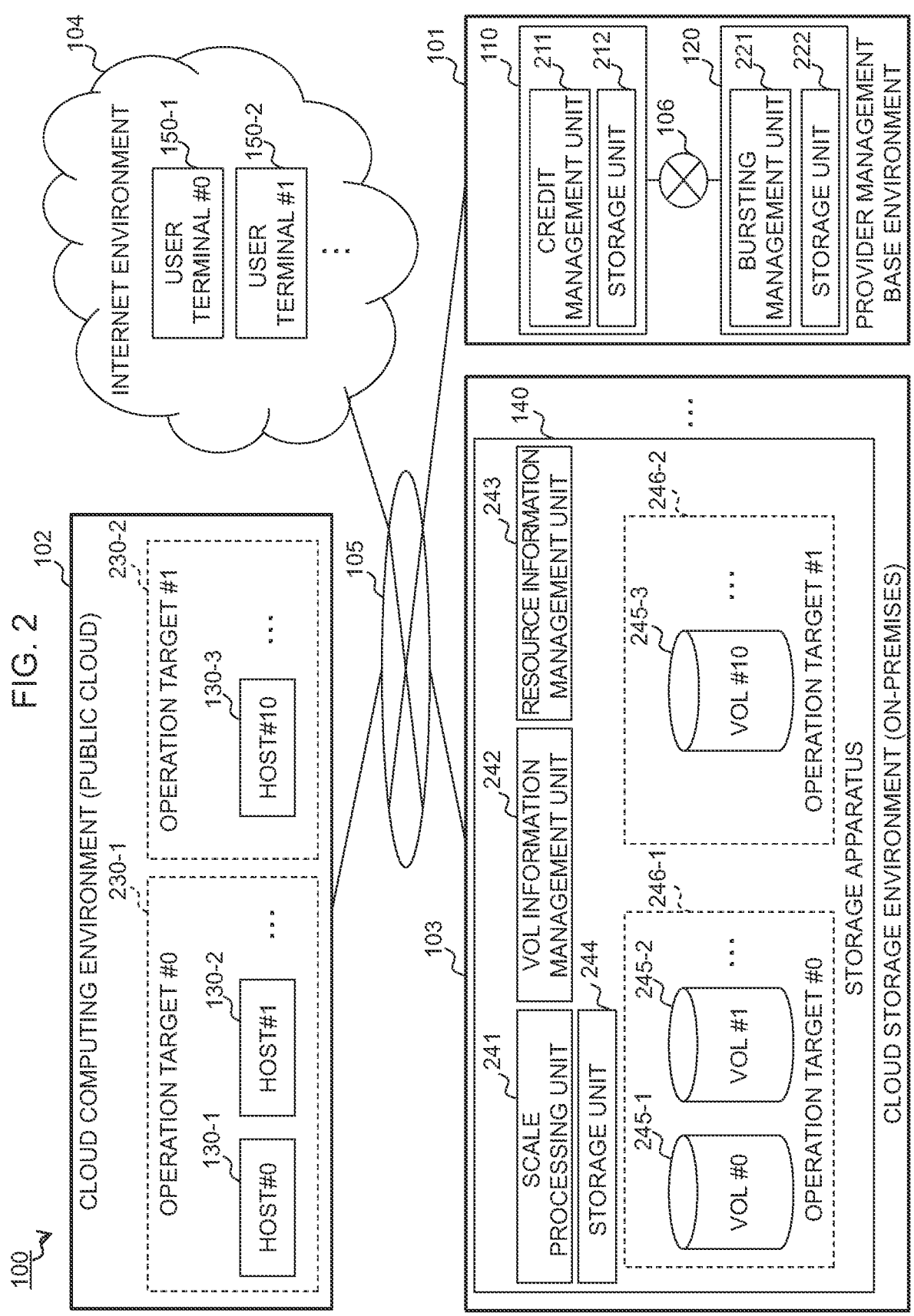
FIG. 2 is a diagram illustrating an example of a functional configuration of the information processing system according to the first embodiment.

FIG. 2 is a diagram illustrating an example of a functional configuration of the information processing system 100.

The credit management server 110 in the provider management base environment 101 includes a credit management unit 211 and a storage unit 212.

The credit management unit 211 receives information relating to volumes (VOL) from the storage apparatus 140 and adds (accumulates) the credit amount on the basis of the IOPS of the VOLs contained in the received information. The credit management unit 211 receives information relating to the cache 145 from the storage apparatus 140 and subtracts (consumes) the credit amount on the basis of an additionally allocated resource amount which is included in the received information. The credit management unit 211 transmits the credit amount to the bursting management server 120 at a specified timing (for example, every second). In response to an inquiry about the credit amount from the user terminal 150, the credit management unit 211 transmits information including that credit amount to the user terminal 150.

The storage unit 212 stores, as the information relating to the credit amount, credit setting information, user information, operation target credit amount information, user credit amount information, and so on. Incidentally, the credit setting information will be explained later by using FIG. 3; the user information will be explained later by using FIG. 4; the operation target credit amount information will be explained later by using FIG. 5; and the user credit amount information will be explained later by using FIG. 6.

Functions of the credit management server 110 (for example, the credit management unit 211) may be implemented, for example, by the CPU 111 reading programs stored in the storage device 113 to the memory 112 and executing them (software), or may be implemented by hardware such as a dedicated circuit, or may be implemented by a combination of the software and the hardware. Incidentally, one function of the credit management server 110 may be divided into a plurality of functions or the plurality of functions may be integrated into one function. Furthermore, some of the functions of the credit management server 110 may be provided as another function or may be included in another function. Furthermore, some of the functions of the credit management server 110 may be implemented by another computer capable of communicating with the credit management server 110.

The bursting management server 120 in the provider management base environment 101 includes a bursting management unit 221 and a storage unit 222.

The bursting management unit 221 receives information indicating the bursting requirements from the user terminal 150 and stores it in the storage unit 222. The bursting management unit 221 manages the resource amount of the storage apparatus 140 to be allocated to the host(s) 130 on the basis of the bursting requirements, scale-out of the host(s) 130 (an increase in the number of hosts 130), scale-in of the host(s) 130 (a decrease in the number of the hosts 130), and so on.

For example, if the bursting management unit 221 detects that the bursting requirements are satisfied, it sends an instruction to the storage apparatus 140 to increase at least one of the number of the processors 144 allocated to the host 130, the cache capacity of the cache 145 allocated to the host 130, and the number of the ports 148 allocated to the host 130. In accordance with this instruction, the storage apparatus 140 increases the number of the processors 144 allocated to the host 130, the cache capacity of the cache 145 allocated to the host 130, and/or the number of the ports 148 allocated to the host 130.

Furthermore, for example, if the VOL 245 has a high load, the bursting management unit 221 identifies data with high access frequency from each host 130 and data with high access frequency from a specific host 130, respectively, and sends an instruction to the storage apparatus 140 to copy the identified data to a specified VOL 245. The storage apparatus 140 copies the data to the specified VOL 245 in accordance with this instruction. If the specified VOL 245 has a low load, the bursting management unit 221 may send an instruction to the storage apparatus 140 to delete the copied data from the specified VOL 245 in order to delete the copied data. The storage apparatus 140 deletes the copied data from the specified VOL 245 in accordance with this instruction.

An explanation will be provided below by taking an example of a case where the cache capacity of the cache 145 of the storage apparatus 140 to be allocated to the host 130 is added based on the bursting requirements. For example, the bursting management unit 221: calculates the cache capacity which can be additionally allocated, from the information relating to the credit amount which is transmitted from the credit management server 110, and the information relating to the cache 145 which is transmitted from the storage apparatus 140; and sends an instruction (bursting instruction) to the storage apparatus 140 to allocate the calculated cache capacity.

The storage unit 222 stores bursting requirement information, bursting management information, and so on as information relating to bursting. Incidentally, the bursting requirement information will be explained later by using FIG. 7 and the bursting management information will be explained later by using FIG. 8.

Functions of the bursting management server 120 (for example, the bursting management unit 221) may be implemented, for example, by the CPU 121 reading programs stored in the storage device 123 to the memory 122 and executing them (software), or may be implemented by hardware such as a dedicated circuit, or may be implemented by a combination of the software and the hardware. Incidentally, one function of the bursting management server 120 may be divided into a plurality of functions or the plurality of functions may be integrated into one function. Moreover, some of the functions of the bursting management server 120 may be provided as another function or may be included in another function. Furthermore, some of the functions of the bursting management server 120 may be implemented by another computer capable of communicating with the bursting management server 120.

The cloud computing environment 102 is provided with operation targets 230, each of which includes one or more hosts 130. The operation target 230 may be: in host group units; in iSCSI target units if a communication protocol between the host 130 and the storage apparatus 140 via the network 105 is iSCSI (internet Small Computer System Interface); or in other units. Incidentally, a host group is a group that is set for each port 148 and controls the VOLs 245 which can be accessed by the host 130. The iSCSI targets are: apparatuses with which an iSCSI initiator communicates; and are, for example, the storage apparatus 140, the VOLs 245, etc. in this embodiment. The iSCSI initiator is an apparatus which proactively issues iSCSI commands, and is the host 130 in this embodiment.

The storage apparatus 140 in the cloud storage environment 103 includes a scale processing unit 241, a VOL information management unit 242, a resource information management unit 243, a storage unit 244, and VOLs 245.

The scale processing unit 241 changes, for example, the number of the processors 144, the number of the ports 148, the cache capacity of the cache 145, and the configuration of the VOLs 245. For example, the scale processing unit 241 increases the number of the processors 144 allocated to the host 130, increases the number of the ports 148, and/or increases the cache capacity of the cache 145 allocated to the host 130 in accordance with the bursting instruction.

The VOL information management unit 242 manages, for example, the IOPS of the VOLs 245, access frequency (the number of accesses) of each data read/written from/to the VOLs 245, and bias in data accesses with respect to each host 130, that is, how many times which host 130 accessed which data, on the basis of I/O commands output from the host 130.

The resource information management unit 243 acquires respective pieces of information regarding the current latency of the storage apparatus 140, the load status of the processor 144, the cache 145, and the port 148, and the load status of the VOLs 245 from/to which the host 130 reads/writes data (storage areas of the disk unit 143 associated with the VOLs 245).

The storage unit 244 stores, for example, VOL status information, cache management information, cache status information, cache allocation information, and so on as the information relating to the storage apparatus 140. Incidentally, the VOL status information will be explained later by using FIG. 9; the cache management information will be explained later by using FIG. 10; the cache status information will be explained later by using FIG. 11; and the cache allocation information will be explained later by using FIG. 12.

The VOLs 245 are composed of storage areas provided by the storage device 141. The VOLs 245 are associated with virtual volumes, which are virtually defined in the storage apparatus 140, and are provided to the host 130 as storage areas from/to which such virtual volumes reads/writes data.

Incidentally, one or a plurality of storage devices 141 may be managed as a RAID (Redundant Arrays of Inexpensive Disks) group and storage areas provided by the storage devices 141 which constitute the RAID group may be managed collectively as one pool. In this case, one or a plurality of volumes (the VOLs 245) which are composed of some of the storage areas for the pool are respectively set in the pool.

Functions of the storage apparatus 140 (such as the scale processing unit 241) may be implemented, for example, by the processor 144 reading programs stored in the storage device 141 to the memory 146 and executing them (software), or may be implemented by hardware such as a dedicated circuit, or may be implemented by a combination of the software and the hardware. Incidentally, one function of the storage apparatus 140 may be divided into a plurality of functions or the plurality of functions may be integrated into one function. Moreover, some of the functions of the storage apparatus 140 may be provided as another function or may be included in another function. Furthermore, some of the functions of the storage apparatus 140 may be implemented by another computer capable of communicating with the storage apparatus 140.

FIG. 3 is a diagram illustrating one example of the credit setting information (a credit setting table 300). The credit setting table 300 manages information relating to settings of the credit amount for each operation target.

More specifically, the credit setting table 300 includes items of an operation target number 301, a set TOPS 302, and a conversion coefficient 303. The operation target number 301 stores information capable of identifying the relevant operation target (such as information capable of identifying the relevant host group and information capable of identifying the relevant iSCSI target). The set TOPS 302 stores information which is input by the user, that is, the TOPS required by the user for the relevant operation target (hereinafter referred to as the "set TOPS"). The conversion coefficient 303 stores a coefficient for converting the TOPS into the cache capacity (for example, conversion) when calculating the credit amount of the relevant operation target.

FIG. 4 is a diagram illustrating one example of the user information (a user table 400). The user table 400 manages information relating to users for each operation target.

More specifically, the user table 400 includes items of an operation target number 401 and a user number 402. The operation target number 401 stores information capable of identifying the relevant operation target. The user number 402 stores information capable of identifying a user who operates the relevant operation target.

FIG. 5 is a diagram illustrating one example of the operation target credit amount information (an operation target credit amount table 500). The operation target credit amount table 500 is provided for each time point and manages information of items relating to the credit amount for each operation target.

More specifically, the operation target credit amount table 500 includes items of an operation target number 50, a total IOPS 502, a set IOPS 503, a difference IOPS 504, a conversion coefficient 505, an accumulated credit amount 506, and a consumed credit amount 507 as items relating to the credit amount.

The operation target number 501 stores information capable of identifying the relevant operation target. The total IOPS 502 stores a total value of the IOPS of the VOLs 245 associated with the host 130 included in the relevant operation target at the relevant time point (hereinafter referred to as the "total TOPS"). The set IOPS 503 stores a set IOPS of the relevant operation target. The difference IOPS 504 stores the difference between the total IOPS and the set IOPS (hereinafter referred to as the "difference TOPS"). The conversion coefficient 505 stores a conversion coefficient of the relevant operation target. The accumulated credit amount 506 stores a value obtained by multiplying the difference IOPS by the conversion coefficient (hereinafter referred to as the "accumulated credit amount"). Incidentally, when the accumulated credit amount is a negative value, "0" is stored. The consumed credit amount 507 stores a cache capacity added to the relevant operation target at the relevant time point (hereinafter referred to as the "consumed credit amount").

FIG. 6 is a diagram illustrating one example of the user credit amount information (a user credit amount table 600). The user credit amount table 600 is provided for each time point and manages information of items relating to the credit amount for each user.

More specifically, the user credit amount table 600 includes items of a user number 601, a credit amount 602, an accumulated credit amount 603, a consumed credit amount 604, and a credit amount one second later 605 as the items relating to the credit amount. The user number 601 stores information capable of identifying the relevant user. The credit amount 602 stores the credit amount at the relevant time point regarding the relevant user. The accumulated credit amount 603 stores the accumulated credit amount at the relevant time point regarding the relevant user. The consumed credit amount 604 stores the consumed credit amount at the relevant time point regarding the relevant user. The credit amount one second later 605 stores the credit amount one second after the relevant time point (=the credit amount+the accumulated credit amount—the consumed credit amount).

FIG. 7 is a diagram illustrating one example of the bursting requirement information (a bursting requirement table 700). The bursting requirement table 700 manages information relating to the bursting requirements regarding each bursting.

More specifically, the bursting requirement table 700 includes items of a bursting number 701, a user number 702, an operation target number 703, a starting date and time 704, duration 705, job multiplicity 706, and an additional required cache capacity 707.

The bursting number 701 stores information capable of identifying the relevant bursting. The user number 702 stores information capable of identifying a user who demands the relevant bursting. The operation target number 703 stores information capable of identifying an operation target which is a target of the relevant bursting. The starting date and time 704 stores the date and time when the relevant bursting is started. The duration 705 stores a period of time during which the relevant bursting continues. The job multiplicity 706 stores the number of jobs which can be executed at the same time during the relevant bursting. The additional required cache capacity 707 stores the cache capacity which needs to be added in order to execute the relevant number of jobs upon the relevant bursting (hereinafter referred to as the "additional required cache capacity").

FIG. 8 is a diagram illustrating one example of the bursting management information (a bursting management table 800). The bursting management table 800 is provided for each time point and manages information relating to bursting.

More specifically, the bursting management table 800 includes items of a bursting number 801, a user number 802, a credit amount one second later 803, an additional required cache capacity one second later 804, a credit amount rate one second later 805, and an additional allocated cache capacity one second later 806.

The bursting number 801 stores information capable of identifying the relevant bursting. The user number 802 stores information capable of identifying a user who demands the relevant bursting. The credit amount one second later 803 stores the credit amount one second after the relevant time point regarding the relevant user. The additional required cache capacity one second later 804 stores the additional required cache capacity one second after the relevant time point upon the relevant bursting. The credit amount rate one second later 805 stores a credit amount rate of the relevant user one second after the relevant time point. The additional allocated cache capacity one second later 806 stores the cache capacity to be additionally allocated one second after the relevant time point upon the relevant bursting.

FIG. 9 is a diagram illustrating one example of the VOL status information (a VOL status table 900). The VOL status table 900 is provided for each time point and manages the status of each VOL 245 existing in the storage apparatus 140.

More specifically, the VOL status table 900 includes items of a VOL number 901, an operation target number 902, and an IOPS 903. The VOL number 901 stores information capable of identifying the relevant VOL 245. The operation target number 902 stores information capable of identifying an operation target associated with the relevant VOL 245. The IOPS 903 stores the IOPS of the relevant VOL 245 at the relevant time point.

FIG. 10 is a diagram illustrating one example of the cache management information (a cache management table 1000). The cache management table 1000 manages a cache capacity to be allocated as a default to the storage apparatus 140 with respect to each operation target.

More specifically, the cache management table 1000 includes items of an operation target number 1001 and a default cache allocation amount 1002. The operation target number 1001 stores information capable of identifying the relevant operation target. The default cache allocation amount 1002 stores a cache capacity to be allocated as a default to the relevant operation target.

FIG. 11 is a diagram illustrating one example of the cache status information (a cache status table 1100). The cache status table 1100 manages the status of the cache 145 for the storage apparatus 140.

More specifically, the cache status table 1100 includes items of a total cache capacity 1101, a total default cache allocation amount 1102, and a default free cache capacity 1103. The total cache capacity 1101 stores a cache capacity of the entire storage apparatus 140. The total default cache allocation amount 1102 stores a total value of a cache capacity to be allocated as a default to operation targets in the storage apparatus 140 (hereinafter referred to as the "default cache allocation amount"). The default free cache capacity 1103 stores a cache capacity which is not allocated as the default in the storage apparatus 140 (hereinafter referred to as the "free cache capacity"). Incidentally, the default free cache capacity 1103 stores a value obtained by subtracting the total default cache allocation amount 1102 from the total cache capacity 1101.

FIG. 12 is a diagram illustrating one example of the cache allocation information (a cache allocation table 1200). The cache allocation table 1200 is provided for each time point and manages the cache capacity allocation status of the cache 145 regarding each operation target.

More specifically, the cache allocation table 1200 includes items of an operation target 1201, a default cache allocation amount 1202, an additional allocated cache capacity 1203, a total allocated cache capacity 1204, and an additional allocated cache capacity one second later 1205. The operation target 1201 stores information capable of identifying the relevant operation target. The default cache allocation amount 1202 stores a default cache allocation amount of the relevant operation target. The additional allocated cache capacity 1203 stores a cache capacity to be additionally allocated to the relevant operation target at the relevant time point. The total allocated cache capacity 1204 stores a total amount (sum) of the cache capacity to be allocated to the relevant operation target at the relevant time point. The additional allocated cache capacity one second later 1205 stores a cache capacity to be additionally allocated to the relevant operation target one second after the relevant time point.

Next, processing by the information processing system 100 will be explained by using FIG. 13 to FIG. 18.

Figure 13:
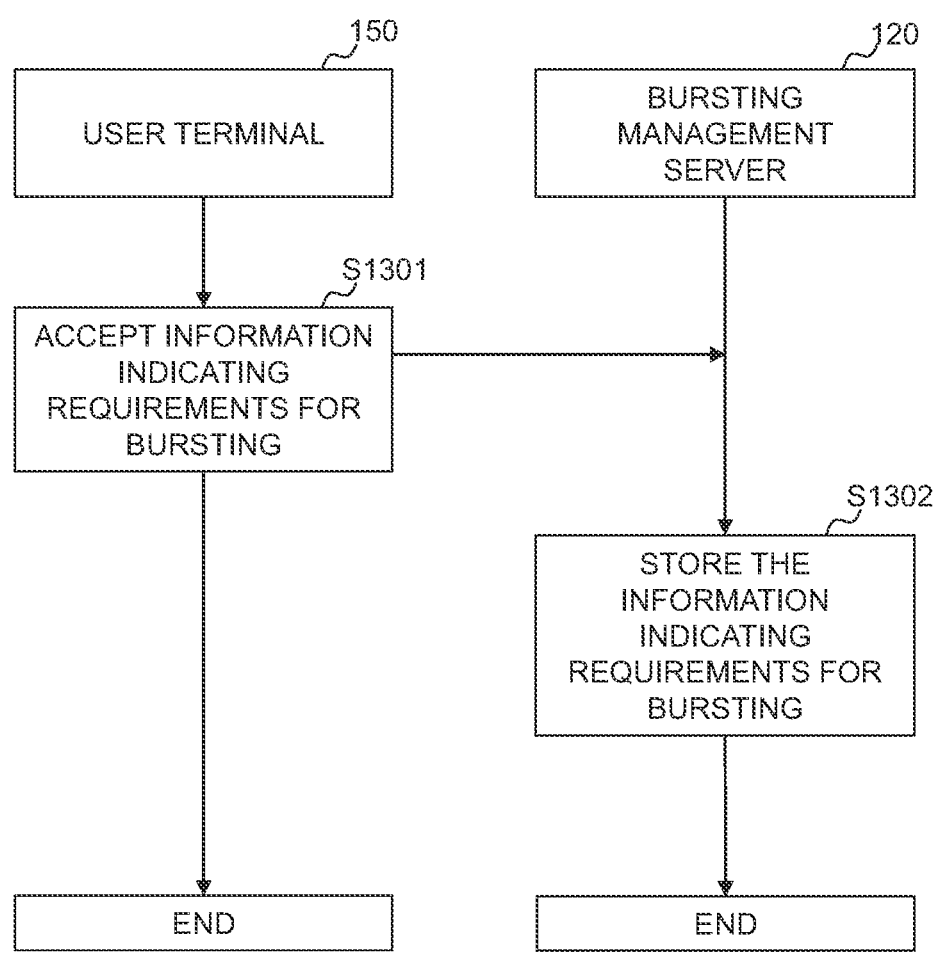
FIG. 13 is a diagram illustrating an example of bursting setting processing according to the first embodiment.

FIG. 13 is a diagram illustrating an example of processing for setting the bursting requirements (bursting setting processing).

In S1301, the user terminal 150 accepts information indicating the bursting requirements from the user and transmits the accepted information indicating the bursting requirements to the bursting management server 120. For example, the user terminal 150 accepts the information indicating the bursting requirements via an input screen 1800 described later.

In S1302, the bursting management server 120 stores the received information indicating the bursting requirements in the bursting requirement table 700. When this happens, the bursting management server 120 acquires the cache capacity which needs to be added via bursting. For example, the bursting management server 120: calculates the additional required cache capacity by using a known technology on the basis of the job multiplicity, the maximum IOPS per job, and so on which are included in the information indicating the bursting requirements; and stores the additional required cache capacity in the bursting requirement table 700. Incidentally, the bursting management server 120 may calculate the additional required cache capacity by acquiring, for example, a data size of a bursting target workload, the number of virtual machines of the host 130 for the cloud computing environment 102 (the public cloud side) to be scaled out, and the number of cores of the host 130 on the public cloud side to be scaled out. Furthermore, the additional required cache capacity may be input by the user or may be determined in advance corresponding to the job multiplicity and/or the maximum IOPS per job.

Figure 14:
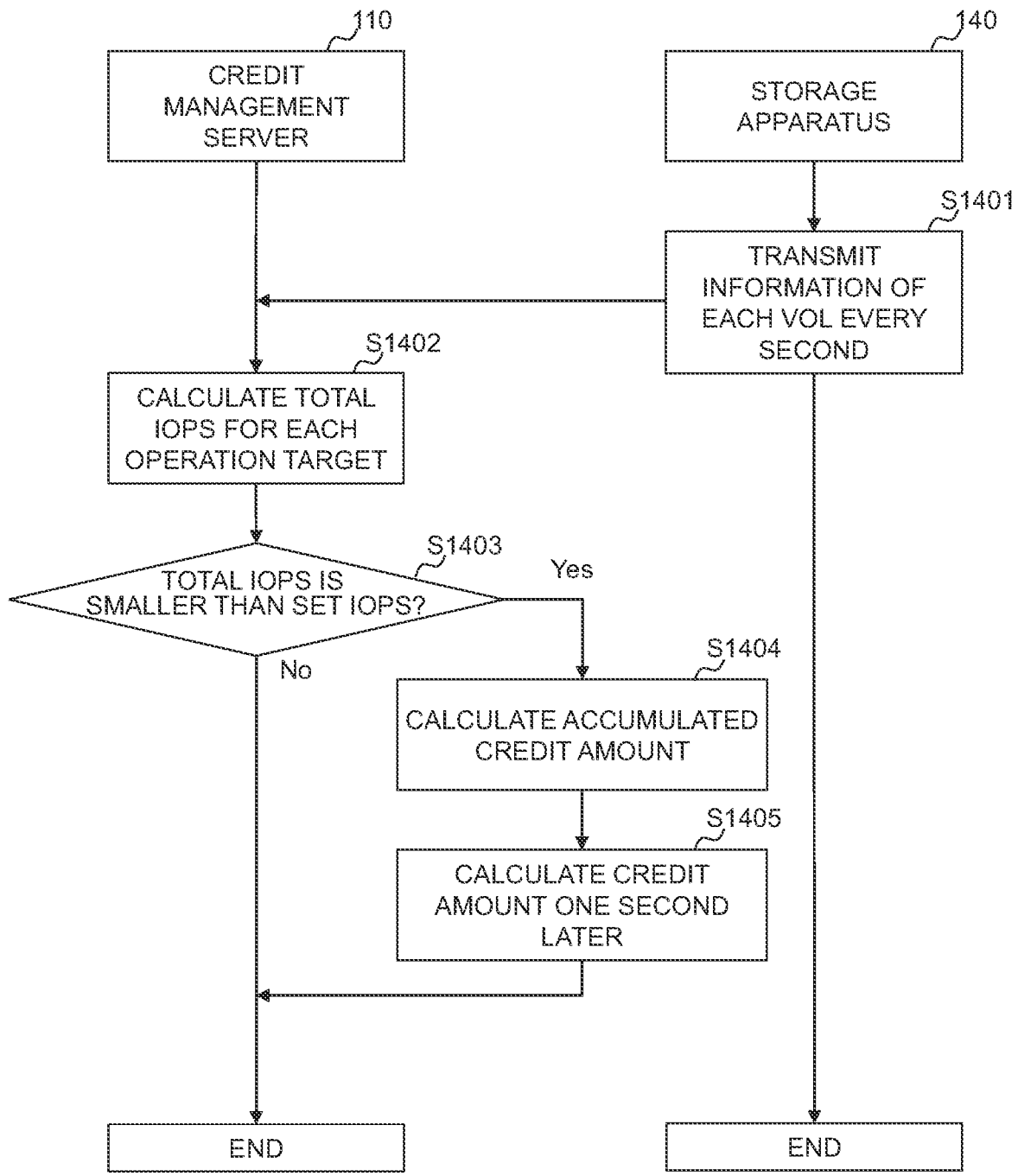
FIG. 14 is a diagram illustrating an example of accumulation processing according to the first embodiment.

FIG. 14 is a diagram illustrating an example of processing for accumulating (adding) the credit amount (accumulation processing). Incidentally, it is assumed that the credit management server 110 creates the operation target credit amount table 500 and the user credit amount table 600 at every specified time interval (for example, every second).

In S1401, the storage apparatus 140 transmits the information of each VOL 245 to the credit management server 110 every second. For example, the storage apparatus 140 transmits the information of the VOL status table 900 to the credit management server 110 every second.

In S1402, the credit management server 110 calculates the total IOPS of each operation target. More specifically, the credit management server 110 calculates the total IOPS of the VOLs 245 included in the relevant operation target with respect to each operation target. Incidentally, the calculated total IOPS is stored in the operation target credit amount table 500 of the relevant time point.

In S1403, the credit management server 110 judges, with respect to each operation target, if the total IOPS is smaller than the set IOPS or not. If the credit management server 110 determines, with respect to one or more operation targets, that the total IOPS is smaller than the set IOPS, it proceeds to the processing in S1404; and if the credit management server 110 determines, with respect to all the operation targets, that the total IOPS is not smaller than the set IOPS, it terminates the accumulation processing. Incidentally, before terminating the accumulation processing, the credit management server 110 updates the difference IOPS and the accumulated credit amount in the operation target credit amount table 500 of the relevant time point and the accumulated credit amount in the user credit amount table 600.

In S1404, the credit management server 110 calculates the accumulated credit amount. For example, the credit management server 110: calculates the difference between the total IOPS and the set IOPS (the difference IOPS); and calculates the accumulated credit amount by multiplying the difference IOPS by the conversion coefficient. Incidentally, the difference IOPS calculated in S1404 is stored in the operation target credit amount table 500 of the relevant time point. Moreover, the accumulated credit amount calculated in S1404 is stored in the operation target credit amount table 500 and the user credit amount table 600 of the relevant time point.

In S1405, the credit management server 110 calculates the credit amount one second later. For example, the credit management server 110 calculates the credit amount one second later by adding the accumulated credit amount calculated in S1404 to the credit amount of the relevant time point for a user linked to each operation target (or the credit amount one second later if the consumed credit amount of the relevant time point is calculated). Incidentally, the credit amount one second later which is calculated in S1405 is stored in the user credit amount table 600 of the relevant time point.

Figure 15:
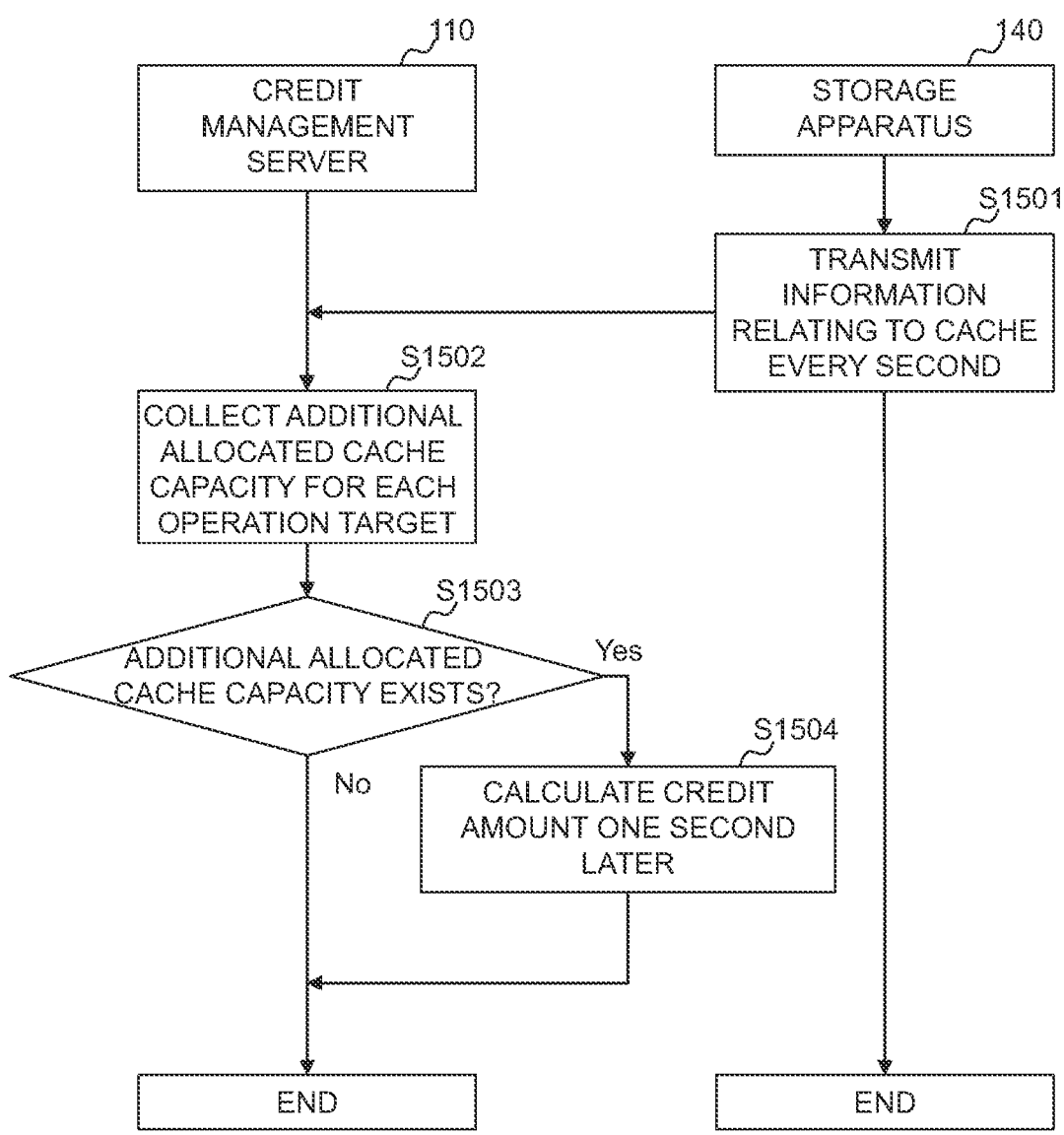
FIG. 15 is a diagram illustrating an example of consumption processing according to the first embodiment.

FIG. 15 is a diagram illustrating an example of processing for consuming (subtracting) the credit amount (consumption processing).

In S1501, the storage apparatus 140 transmits the information relating to the cache 145 to the credit management server 110 every second. For example, the storage apparatus 140 transmits the information of the cache allocation table 1200 to the credit management server 110 every second.

In S1502, the credit management server 110 stores (collects) the additional allocated cache capacity for each operation target. Incidentally, the additional allocated cache capacity is stored, as the consumed credit amount, the operation target credit amount table 500 and the user credit amount table 600 of the relevant time point.

In S1503, the credit management server 110 judges, with respect to each operation target, whether or not the additional allocated cache capacity exists (whether or not the additional allocated cache capacity is larger than "0"). If the credit management server 110 determines, with respect to one or more operation targets, that the additional allocated cache capacity exists, it proceeds to the processing in S1504; and if the credit management server 110 determines, with respect to all the operation targets, that the additional allocated cache capacity does not exist, it terminates the consumption processing.

In S1504, the credit management server 110 calculates the credit amount one second later. For example, the credit management server 110 calculates the credit amount one second later by subtracting the additional allocated cache capacity from the credit amount of the relevant time point for the user linked to each operation target (or the credit amount one second later if the accumulated credit amount of the relevant time point is calculated). Incidentally, the credit amount one second later which is calculated in S1504 is stored in the user credit amount table 600 of the relevant time point.

Incidentally, the concept of the management of the credit amount (the accumulation processing and the consumption processing) will be described later by using FIG. 19.

Figure 16:
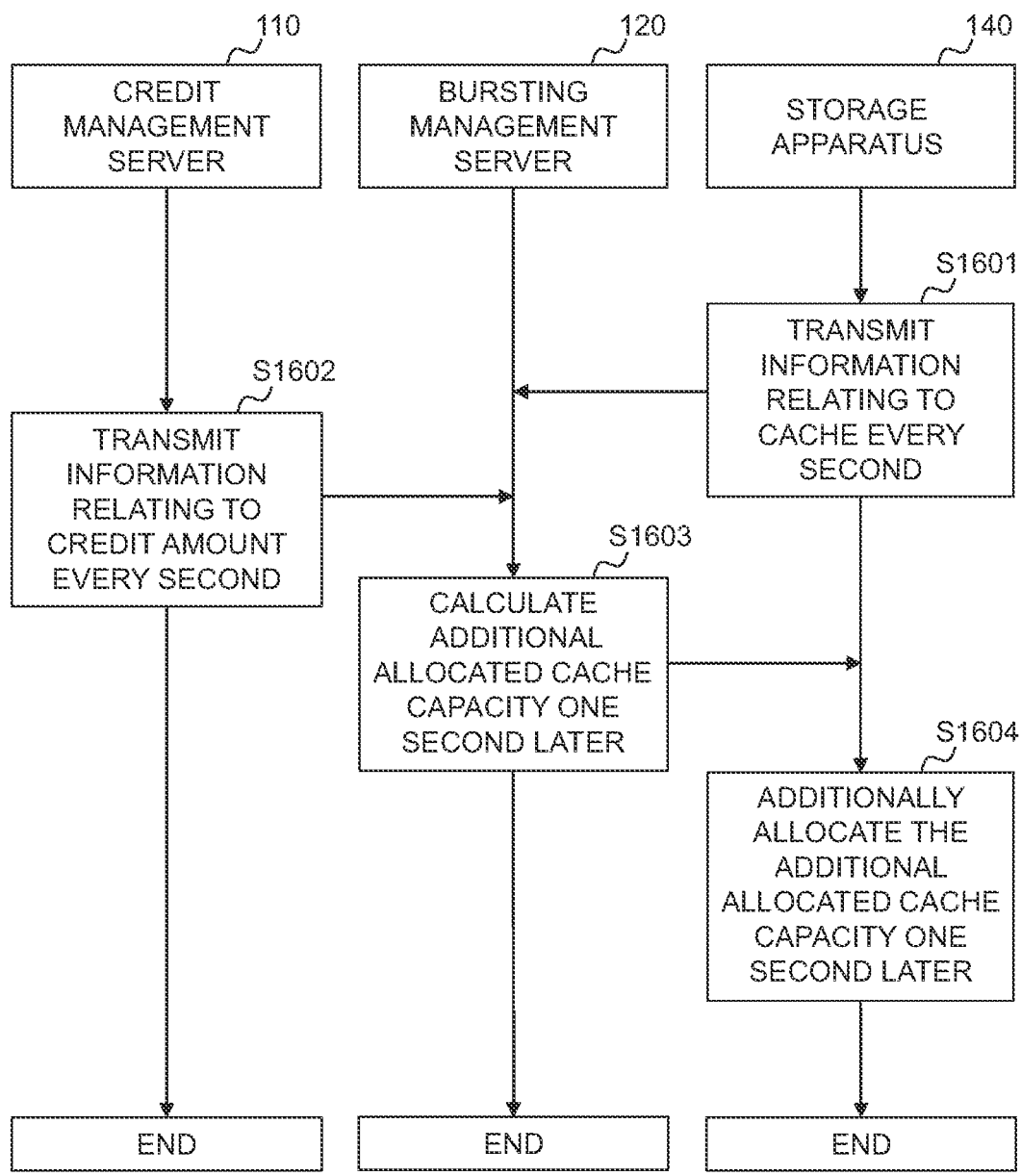
FIG. 16 is a diagram illustrating an example of allocation processing according to the first embodiment.

FIG. 16 is a diagram illustrating an example of processing for allocating the cache capacity required for bursting (allocation processing). Incidentally, it is assumed that the bursting management server 120 creates the bursting management table 800 at every specified time interval (for example, every second).

In S1601, the storage apparatus 140 transmits the information relating to the cache 145 to the bursting management server 120 every second. The storage apparatus 140 transmits, for example, the information of the cache status table 1100 to the bursting management server 120 every second.

In S1602, the credit management server 110 transmits the information relating to the credit amount to the bursting management server 120 every second. For example, the credit management server 110 transmits the information of the user credit amount table 600 to the bursting management server 120 every second. Incidentally, the bursting management server 120 stores the credit amount one second later in the bursting management table 800 of the relevant time point.

In S1603, the bursting management server 120 calculates the cache capacity to be additionally allocated one second after the relevant time point (the next one second) (the additional allocated cache capacity one second later) regarding each operation target and transmits the calculated additional allocated cache capacity one second later to the storage apparatus 140. For example, the bursting management server 120 refers to the bursting requirement table 700 and the bursting management table 800, calculates the credit amount rate one second later from the credit amount one second later, and calculates the additional allocated cache capacity one second later according to the credit amount rate one second later. The credit amount rate one second later and the additional allocated cache capacity one second later, which are calculated in S1603, are stored in the bursting management table 800 of the relevant time point. Incidentally, calculation examples of the additional allocated cache capacity one second later will be described later by using FIG. 20 to FIG. 23.

In S1604, the storage apparatus 140 receives the additional allocated cache capacity one second later and actually additionally allocates the received additional allocated cache capacity one second later one second after the relevant time point. When this happens, the storage apparatus 140 updates the cache allocation table 1200 of the relevant time point.

Figure 17:
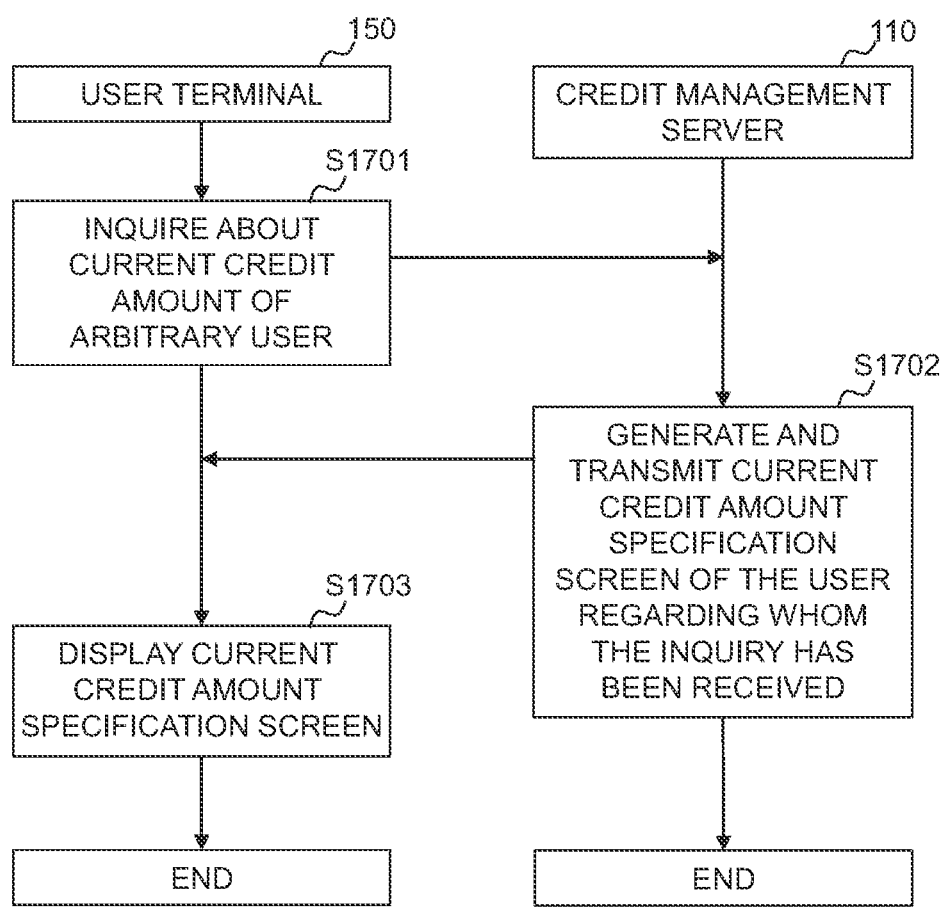
FIG. 17 is a diagram illustrating an example of display processing according to the first embodiment.

FIG. 17 is a diagram illustrating an example of processing for displaying the current credit amount (display processing).

In S1701, the user terminal 150 sends an inquiry about the current credit amount of an arbitrary user to the credit management server 110.

In S1702, the credit management server 110 generates a display screen including the current credit amount of the user, regarding which it has received the inquiry (a credit amount specification screen 2400 described later), and transmits it to the user terminal 150.

In S1703, the user terminal 150 displays the credit amount specification screen 2400. Incidentally, the credit amount specification screen 2400 will be described later by using FIG. 24.

FIG. 18 is a diagram illustrating one example of a screen for inputting the bursting requirements (an input screen 1800).

The input screen 1800 includes an input area 1810 to an input area 1850. The input area 1810 is an input area for inputting the job multiplicity. The input area 1820 is an input area for inputting the maximum IOPS per job. The input area 1830 is an input area for inputting the operation target number. The input area 1840 is an input area for inputting the date and time to start bursting. The input area 1850 is an input area for inputting duration during which the bursting continues.

Figure 19:
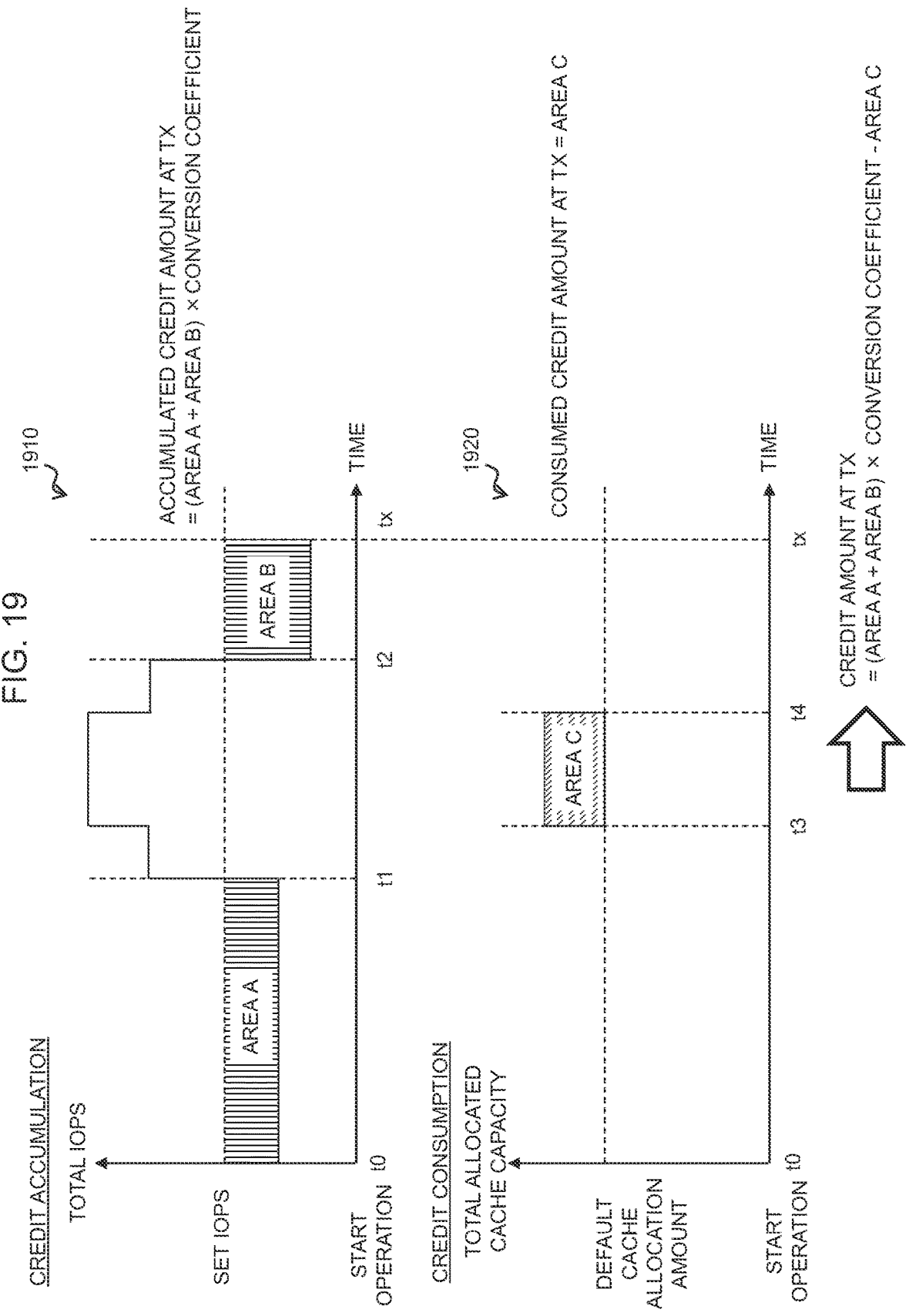
FIG. 19 is a diagram illustrating an example of accumulation and consumption of a credit amount according to the first embodiment.

FIG. 19 is a diagram illustrating one example of accumulation and consumption of the credit amount from the start of operation (t0) to a specified time point (tx) (an accumulation graph 1910 and a consumption graph 1920).

The accumulation graph 1910 shows that, regarding a period of time from t0 to a first time point (t1) and a period of time from a second time point (t2) to tx, the total IOPS does not exceed the set IOPS and the credit amount is thereby accumulated. Regarding the credit amount accumulated until tx, a value obtained by multiplying the difference between the total IOPS and the set IOPS at the relevant time point by the total IOPS the conversion coefficient is calculated with respect to each time point when the total IOPS does not exceed the set IOPS; and the sum (total amount) of the calculated values at the respective time points is calculated.

The consumption graph 1920 shows that, regarding a period of time from a third time point (t3) to a fourth time point (t4), the total allocated cache capacity exceeds the default cache allocation amount and the credit amount is thereby consumed. Regarding the credit amount consumed until tx, the difference between the total allocated cache capacity and the default cache allocation amount at the relevant time point is calculated with respect to each time point when the total allocated cache capacity exceeds the default cache allocation amount; and the sum (total amount) of the calculated differences at the respective time points is calculated.

For example, regarding the accumulation graph 1910, the value obtained by multiplying a total amount of the sum of differences between the total IOPS and the set IOPS at the respective time points from t0 to t1 (Area A) and the sum of differences between the total IOPS and the set IOPS at the respective time points from t2 to t3 (Area B), by the conversion coefficient is calculated as the credit amount accumulated until tx. Furthermore, for example, regarding the consumption graph 1920, the sum of differences between the total allocated cache capacity and the default cache allocation amount at the respective time points from t3 to t4 (Area C) is calculated as the credit amount consumed until tx. Consequently, "(Area A+Area B)×the conversion coefficient—Area C" is calculated as the credit amount accumulated or consumed from the time point t0 to tx.

FIG. 20 to FIG. 23 are diagrams for explaining the cache capacity to be additionally allocated via bursting performed from 00:00:00 on Jan. 1, 2020, to 05:00:00 Jan. 1, 2020.

Figure 20:
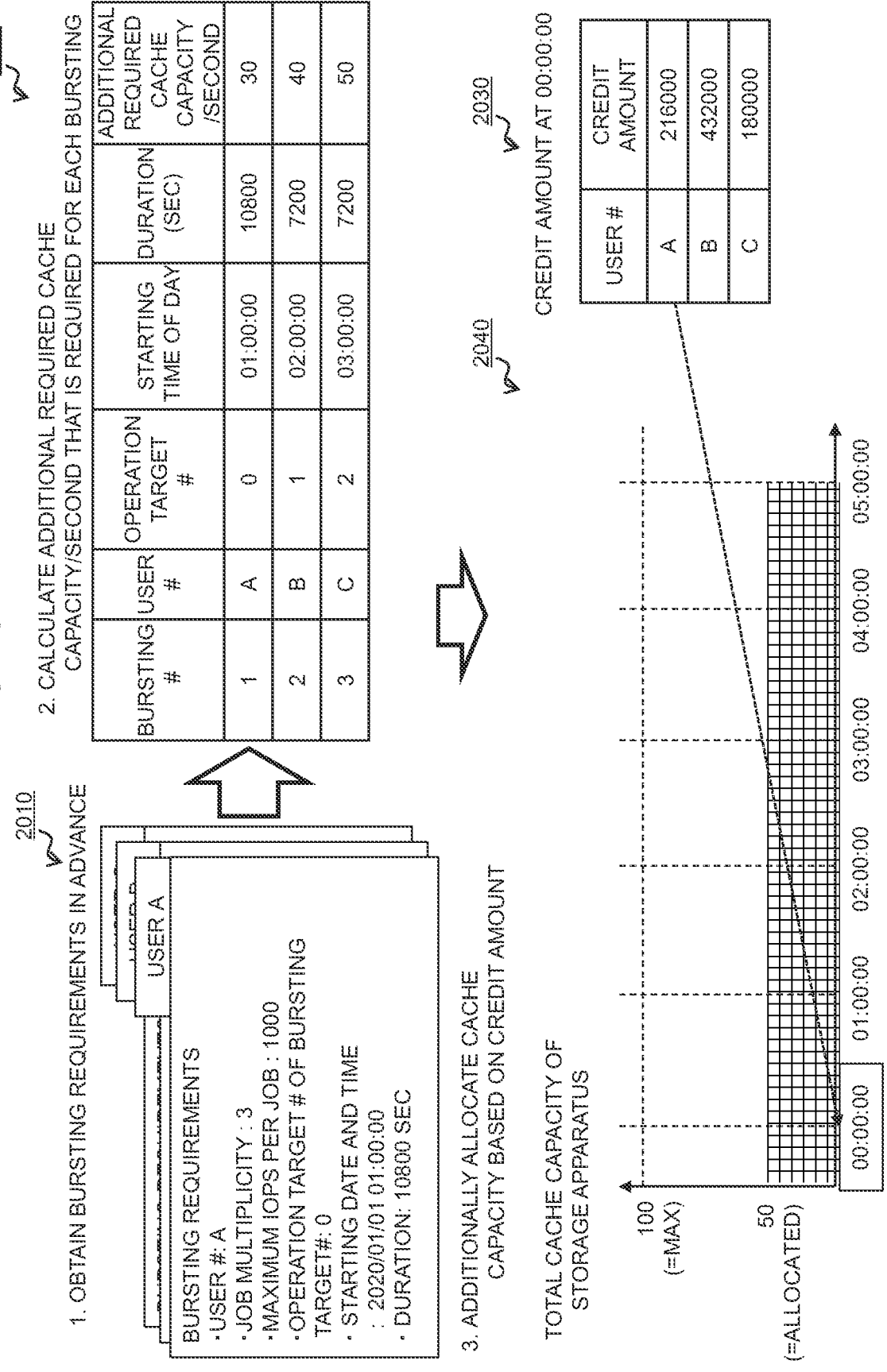
FIG. 20 is a diagram for explaining a cache capacity to be additionally allocated according to the first embodiment.

Referring to FIG. 20, bursting requirement information 2010 indicating the bursting requirements is input to the information processing system 100. An explanation will be provided below by assuming that specific content of the bursting requirement information 2010 is the content indicated in a bursting requirement table 2020, the credit amount of each user at the time point of 00:00:00 is the content indicated by a credit amount table 2030, and the total cache capacity (MAX) and the total default cache allocation amount (ALLOCATED) are the content indicated in a cache capacity allocation graph 2040.

Figure 21:
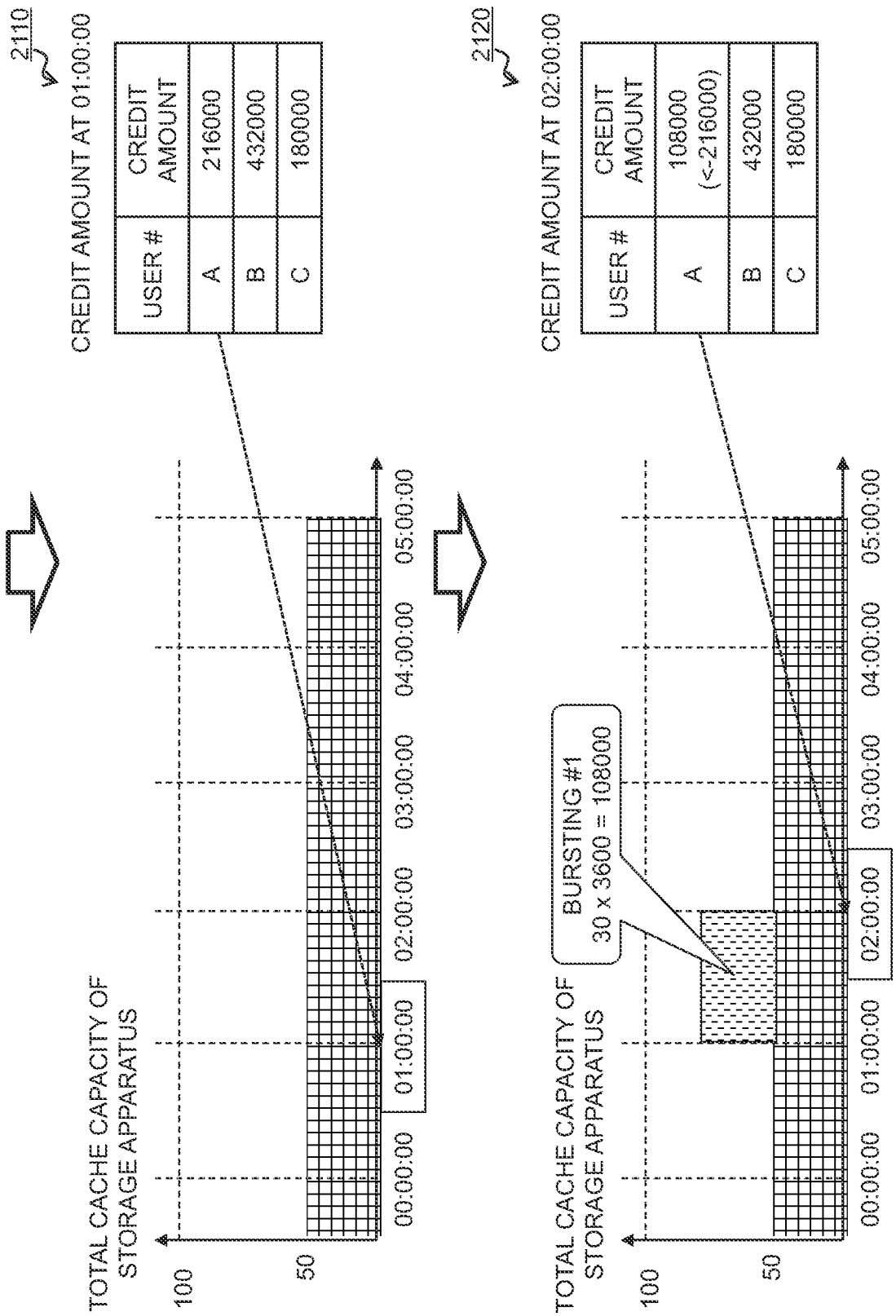
FIG. 21 is a diagram for explaining the cache capacity to be additionally allocated according to the first embodiment.
Figure 22:
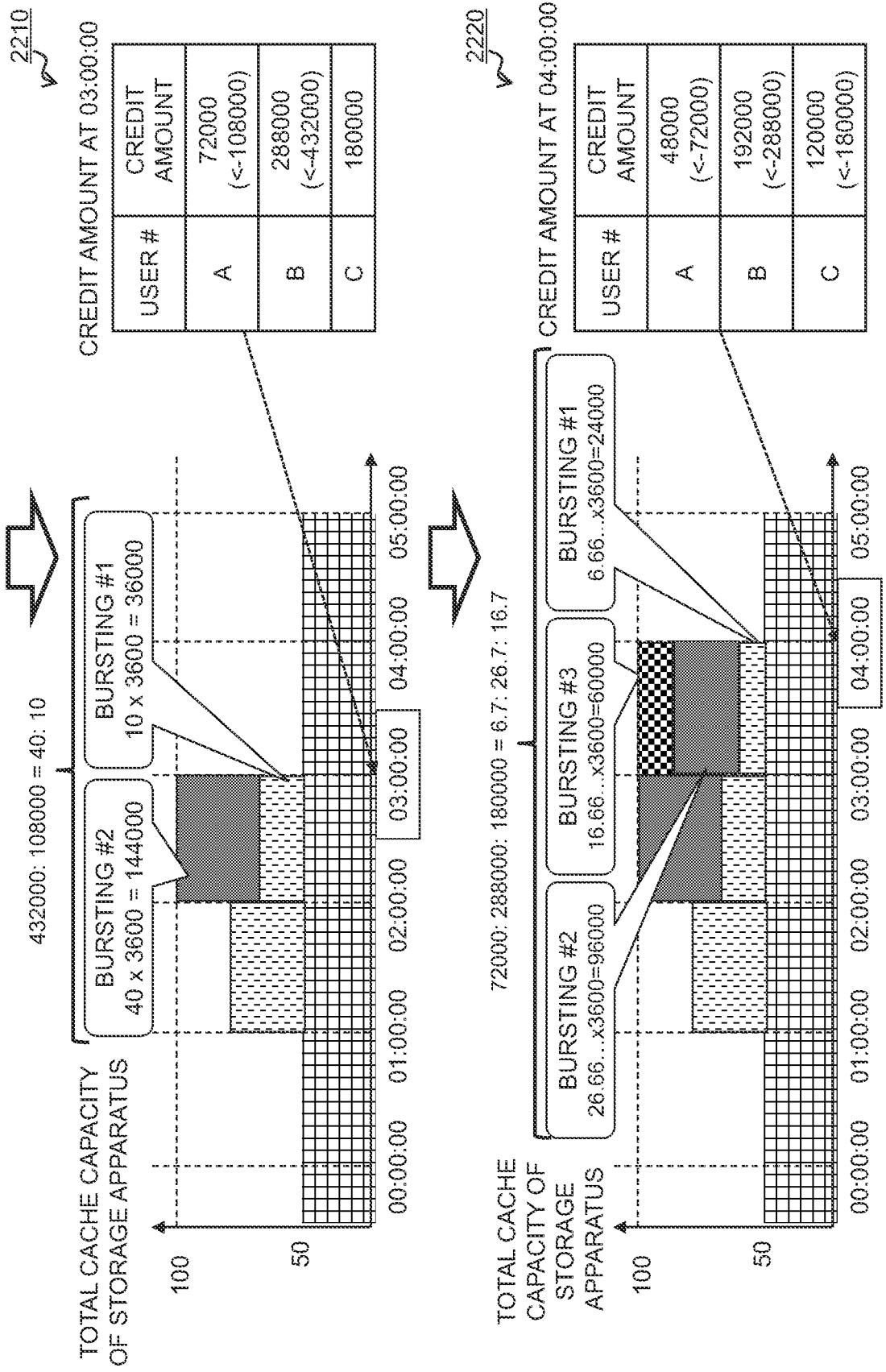
FIG. 22 is a diagram for explaining the cache capacity to be additionally allocated according to the first embodiment.
Figure 23:
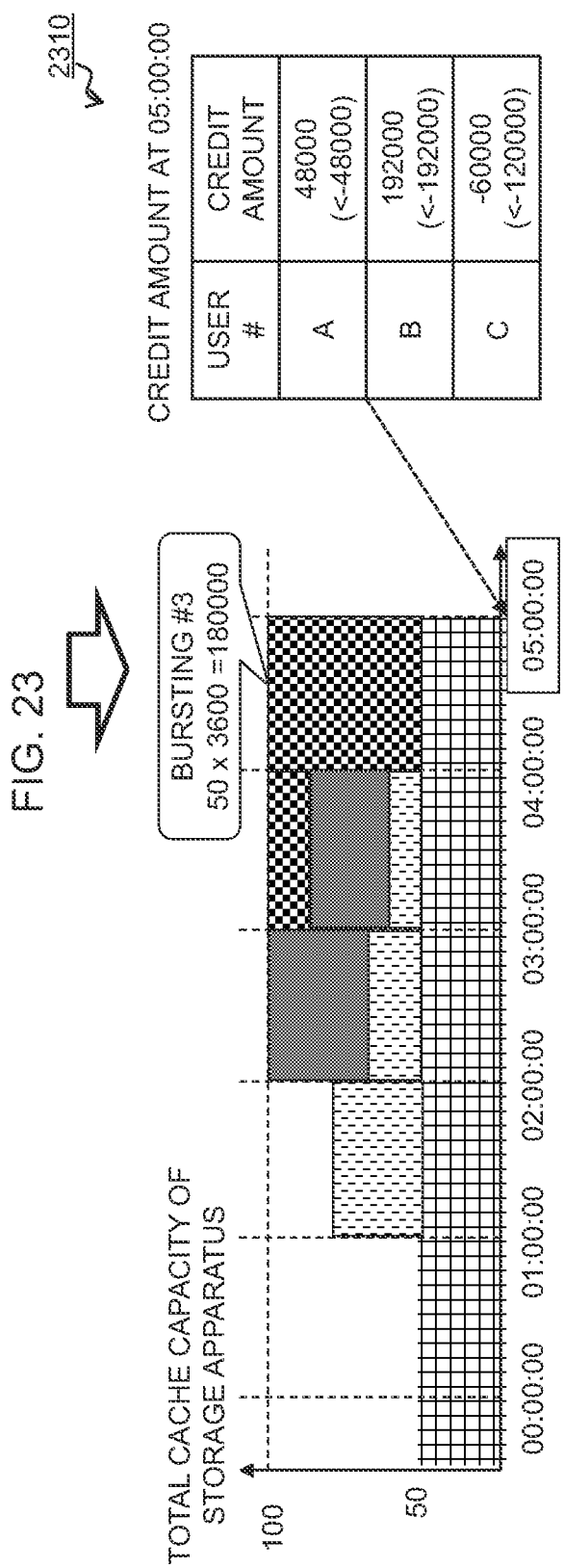
FIG. 23 is a diagram for explaining the cache capacity to be additionally allocated according to the first embodiment.

From 00:00:00 to 00:59:59, if there is no increase or decrease in the credit amount of each user, the credit amount of each user at the time point of 01:00:00 is the same as the content indicated in the credit amount table 2030 and is the content indicated in the credit amount table 2110 in FIG. 21.

From 01:00:00 to 01:59:59 (first period), the additional required cache capacity of user A is "30," the additional required cache capacity of the other remaining users (user B and user C) is "0," and the default free cache capacity is "50." Therefore, regarding the first period, the additional cache capacity "30" is allocated to user A. In this case, "108000 (=30×3600)" is consumed as user A's credit amount, so that user A's credit amount at the time point of 02:00:00 is "108000 (=216000-108000)" as indicated in the credit amount table 2120.

From 02:00:00 to 02:59:59 (second period), the additional required cache capacity of user A is "30," the additional required cache capacity of user B is "40, the additional required cache capacity of the other remaining user (user C) is "0," and the default free cache capacity is "50." Therefore, regarding the second period, the total amount of the additional required cache capacity becomes "70" and the default free cache capacity exceeds "50," so that an additional cache capacity is allocated to user A's operation target and user B's operation target according to user A's credit amount and user B's credit amount.

More specifically, since user A's credit amount is "108000," user B's credit amount is "432000," and a credit amount ratio becomes "108000:432000=1:4," the additional credit amount "10(=50×11(1+4))" is allocated to user A's operation target and the additional credit amount "40(=50×41(1+4))" is allocated to user B's operation target. In this case, "36000(=10×3600)" is consumed as user A's credit amount, user A's credit amount at the time point of 03:00:00 becomes "72000(=108000-36000)" as indicated in the credit amount table 2210. Furthermore, "144000(=40×3600)" is consumed as user B's credit amount, so that user B's credit amount at the time point of 03:00:00 becomes "288000 (=432000-144000)" as indicated in the credit amount table 2210.

From 03:00:00 to 03:59:59 (third period), the additional required cache capacity of user A is "30," the additional required cache capacity of user B is "40," the additional required cache capacity of user C is "50," and the default free cache capacity is "50." Therefore, regarding the third period, the total amount of the additional required cache capacity becomes "120" and the default free cache capacity exceeds "50," so that an additional cache capacity is allocated to user A's operation target, user B's operation target, and user C's operation target according to user A's credit amount, user B's credit amount, and user C's credit amount.

More specifically, user A's credit amount is "72000," user B's credit amount is "288000," user C's credit amount is "180000," and a credit amount ratio is "72000:288000: 180000=6.66 . . . :26.66 . . . :16.66 . . . "; and, therefore, the additional credit amount "6.66 . . . " is allocated to user A's operation target, the additional credit amount "26.66 . . . " is allocated to user B's operation target, and the additional credit amount "16.66 . . . " is allocated to user C's operation target. In this case, "24000" is consumed as user A's credit amount, so that user A's credit amount at the time point of 04:00:00 becomes "48000" as indicated in the credit amount table 2220. Moreover, "96000" is consumed as user B's credit amount, so that user B's credit amount at the time point of 04:00:00 becomes "192000" as indicated in the credit amount table 2220. Furthermore, "60000" is consumed as user C's credit amount, so that user C's credit amount at the time point of 04:00:00 becomes "120000" as indicated in the credit amount table 2220.

From 04:00:00 to 04:59:59 (fourth period), the additional required cache capacity of user C is "50," the additional required cache capacity of the other remaining users (user A and user B) is "0," and the default free cache capacity is "50." Therefore, regarding the fourth period, the additional cache capacity "50" is allocated to user C's operation target. In this case, "180000" is consumed as user C's credit amount, so that user C's credit amount at the time point of 05:00:00 becomes "−60000" as indicated in the credit amount table 2310.

FIG. 24 is a diagram illustrating one example of a screen for displaying the credit amount (a credit amount specification screen 2400).

The credit amount specification screen 2400 includes a display area 2410 and a display area 2420. The display area 2410 is a display area for displaying the current credit amount. For example, the display area 2410 displays the credit amount, the accumulated credit amount, and the consumed credit amount at each time point. The display area 2420 is a display area for displaying information of each operation target. For example, the display area 2420 displays the default cache allocation amount and the conversion coefficient at each time point regarding each operation target.

According to this embodiment, the bursting can be controlled more appropriately.

(II) Supplemental Description

The aforementioned embodiment includes, for example, the following content.

The aforementioned embodiment has described the case where the present invention is applied to the information processing system; however, the present invention is not limited to this example and can be applied to a wide variety of other systems, apparatuses, methods, and programs.

Also, the aforementioned embodiment has described the case where if the bursting management unit 221 detects that the requirements for bursting are satisfied, it sends the instruction to the storage apparatus 140 to start bursting; however, the present invention is not limited to this example. For example, if the bursting management unit 221 detects that a load on the processor 144 exceeds a threshold value, the cache capacity of the cache 145 exceeds a threshold value, or a load on the port 148 exceeds a threshold value, the bursting management unit 221 may send the instruction to the storage apparatus 140 to start bursting.

Moreover, in the aforementioned embodiment, if the bursting management unit 221 detects that the bursting requirements are not satisfied, it may send an instruction to the storage apparatus 140 to reduce the number of the processors 144 allocated to the host 130, the cache capacity of the cache 145 allocated to the host 130, and/or the number of the ports 148 allocated to the host 130. In accordance with this instruction, the storage apparatus 140 reduces the number of the processors 144 allocated to the host 130, the cache capacity of the cache 145 allocated to the host 130, and/or the number of the ports 148 allocated to the host 130.

Furthermore, in the aforementioned embodiment, some or all of the programs may be installed from a program source to apparatuses such as the credit management server 110 and the bursting management server 120. The program source may be, for example, a program distribution computer connected via the network or a computer-readable recording medium (such as a non-transitory recording medium). Furthermore, in the aforementioned explanation, two or more programs may be implemented as one program or one program may be implemented as two or more programs.

Furthermore, in the aforementioned embodiment, the configuration of each table is one example; and one table may be divided into two or more tables or all or some of the two or more tables may be one table.

Furthermore, the screen(s) illustrated and explained in the aforementioned embodiment is one example and any design may be employed as long as the information to be accepted is the same.

Furthermore, the screen(s) illustrated and explained in the aforementioned embodiment is one example and any design may be employed as long as the information to be presented is the same.

Furthermore, in the aforementioned embodiment, outputting of the information is not limited to displaying of the information on a display. The information may be output through, for example, sound output by a speaker, output to files, output to paper media by a printing device, projection onto a screen or the like by a projector, or by other aspects.

Furthermore, information such as programs, tables, and files for implementing each function in the aforementioned explanation can be placed in a memory, storage devices such as hard disks and SSDs, or storage media such as IC cards, SD cards, and DVDs.

The aforementioned embodiment has, for example, the following characteristic configurations.

(1)

An information processing system (for example, the information processing system 100) for performing bursting with respect to a storage apparatus (for example, the storage apparatus 140), which is coupled to a plurality of operation targets (for example, the operation targets 230) including one or more hosts and processes reading and writing of data by the one or more hosts (for example, the host(s) 130), to additionally allocate a resource amount of a specified resource (for example, the number of the processors 144, the cache capacity of the cache 145, and the number of the ports 148) for the storage apparatus relating to the processing, includes: a credit management unit (for example, the credit management unit 211, the credit management server 110, a circuit, or another computer capable of communicating with the credit management server 110) that manages a credit amount for controlling allocation of the resource amount of the resource via the bursting with respect to each of the plurality of operation targets; and a bursting management unit (for example, the bursting management unit 221, the bursting management server 120, a circuit, or another computer capable of communicating with the bursting management server 120) that calculates the resource amount to be added via the bursting with respect to each of the plurality of operation targets according to the credit amount managed by the credit management unit and issues an instruction to the storage apparatus to allocate each calculated resource amount to each of the plurality of operation targets.

According to the above-described configuration, for example, when the plurality of operation targets demand an additional resource amount, the additional resource amount is allocated according to the credit amount; and, therefore, it is possible to avoid, for example, the situation where an operation target which demands bursting earlier than other operation targets may occupy the resources.

(2)

The above-described storage apparatus is provided with volumes (for example, VOLs 245) for each of the plurality of operation targets (for example, see FIG. 2); and the credit management unit: judges whether or not an IOPS (Input Output Per Second) of each volume provided in the storage apparatus is smaller than a preset IOPS (for example, see S1403); and adds a credit amount according to the IOPS of the volume which is determined to be smaller to a credit amount of an operation target associated with the volume (for example, see S1405).

Under this circumstance, the IOPS is the user's operational result and a quantitative index attributable to the user. Specifically speaking, according to the above-described configuration, the credit amount is added by using the quantitative index attributable to the user and the additional resource amount is calculated according to the above-described credit amount, so that the additional resource amount can be set reasonably.

(3)

If the resource amount is additionally allocated to a specified operation target via the bursting, the credit management unit subtracts the credit amount according to the resource amount from the credit amount of the operation target (for example, see S1504).

Under this circumstance, the additional resource amount is the user's operational result and a quantitative index attributable to the user. Specifically speaking, according to the above-described configuration, the credit amount is subtracted by using the quantitative index attributable to the user and the additional resource amount is calculated according to the above-described credit amount, so that the additional resource amount can be set reasonably.

(4)

The storage apparatus is provided with volumes (for example, VOLs 245) for each of the plurality of operation targets; the resource is a cache (for example, the cache 145); and the credit management unit judges whether or not an IOPS (Input Output Per Second) of each volume provided in the storage apparatus is smaller than a preset IOPS, calculates a credit amount by multiplying the IOPS of the volume which is determined to be smaller, by a conversion coefficient, and adds the calculated credit amount to a credit amount of an operation target associated with the volume (for example, see FIG. 14); and if a cache capacity is additionally allocated to a specified operation target via the bursting, the credit management unit calculates a credit amount by multiplying the cache capacity by time during which the cache capacity is additionally allocated, and subtracts the calculated credit amount from the credit amount of the operation target (for example, see FIG. 15).

According to the above-described configuration, the credit amount is managed by using the quantitative index attributable to the user, that is, the IOPS and the additional cache capacity and the additional cache capacity is calculated according to the above-described credit amount, so that the additional cache capacity can be set reasonably.

(5)

The above-mentioned resource is a cache (for example, the cache 145); and if each capacity required to be added regarding the plurality of operation targets via the bursting is larger than a free cache capacity of the cache, the bursting management unit calculates the cache capacity to be added to the operation targets to proportionally divide the free cache capacity at a ratio of the credit amount of the operation targets which demand the addition of the cache capacity, and issues an instruction to the storage apparatus to allocate the calculated cache capacity to the operation targets (for example, see FIG. 20 to FIG. 23).

According to the above-described configuration, the additional cache capacity is calculated by proportionally dividing the free cache capacity by using the credit amount ratio. So, for example, even if the resource amount of the resources is insufficient, the additional cache capacity can be allocated appropriately.

(6)

The credit management unit outputs a credit amount corresponding to an inquiry from a user terminal (for example, the user terminal 150).

According to the above-described configuration, the user can recognize the credit amount and it thereby becomes possible to, for example, change the operation of the host(s), the bursting requirements, etc. so that a large credit amount can be accumulated.

Furthermore, the aforementioned configurations may be changed, rearranged, combined, or omitted as appropriate within the scope not exceeding the gist of the present invention.

It should be understood that items included in a list in the format of "at least one of A, B, and C" can mean (A), (B), (C), (A and B), (A and C), (B and C), or (A, B, and C). Similarly, items listed in the format of "at least one of A, B, or C" can mean (A), (B), (C), (A and B), (A and C), (B and C), or (A, B, and C).

REFERENCE SIGNS LIST

100: information processing system
140: storage apparatus
211: credit management unit
221: bursting management unit

The invention claimed is:

1. An information processing system for performing bursting with respect to a storage apparatus which is coupled to a plurality of operation targets including one or more hosts and processes reading and writing of data by the one or more hosts, to additionally allocate a resource amount of a specified resource for the storage apparatus relating to the processing, the information processing system comprising:

a credit management unit that manages a credit amount for controlling allocation of the resource amount of the resource via the bursting with respect to each of the plurality of operation targets; and a bursting management unit that calculates the resource amount to be added via the bursting with respect to each of the plurality of operation targets according to the credit amount managed by the credit management unit and issues an instruction to the storage apparatus to allocate each calculated resource amount to each of the plurality of operation targets, wherein the storage apparatus is provided with volumes for each of the plurality of operation targets;

wherein the resource is a cache; and wherein the credit management unit judges whether or not an IOPS (Input Output Per Second) of each volume provided in the storage apparatus is smaller than a preset IOPS, calculates a credit amount by multiplying the IOPS of the volume which is determined to be smaller, by a conversion coefficient, and adds the calculated credit amount to a credit amount of an operation target associated with the volume; and if a cache capacity is additionally allocated to a specified operation target via the bursting, the credit management unit calculates a credit amount by multiplying the cache capacity by time during which the cache capacity is additionally allocated, and subtracts the calculated credit amount from the credit amount of the operation target.

2. The information processing system according to claim 1, wherein the storage apparatus is provided with volumes for each of the plurality of operation targets; and wherein the credit management unit: judges whether or not an IOPS (Input Output Per Second) of each volume provided in the storage apparatus is smaller than a preset IOPS; and adds a credit amount according to the IOPS of the volume which is determined to be smaller to a credit amount of an operation target associated with the volume.

3. The information processing system according to claim 1,
wherein if the resource amount is additionally allocated to a specified operation target via the bursting, the credit management unit subtracts the credit amount according to the resource amount from the credit amount of the operation target.

4. The information processing system according to claim 1,
wherein the resource is a cache; and
wherein if each capacity required to be added regarding the plurality of operation targets via the bursting is larger than a free cache capacity of the cache, the bursting management unit calculates the cache capacity to be added to the operation targets to proportionally divide the free cache capacity at a ratio of the credit amount of the operation targets which demand the addition of the cache capacity, and issues an instruction to the storage apparatus to allocate the calculated cache capacity to the operation targets.

5. The information processing system according to claim 1,
wherein the credit management unit outputs a credit amount corresponding to an inquiry from a user terminal.

6. A bursting control method for performing bursting with respect to a storage apparatus which is coupled to a plurality of operation targets including one or more hosts and processes reading and writing of data by the one or more hosts, to additionally allocate a resource amount of a specified resource for the storage apparatus relating to the processing, the bursting control method comprising:
a step executed by a credit management unit managing a credit amount for controlling allocation of the resource amount of the resource via the bursting with respect to each of the plurality of operation targets; and
a step executed by the bursting management unit calculating the resource amount to be added via the bursting with respect to each of the plurality of operation targets according to the credit amount managed by the credit management unit and issuing an instruction to the storage apparatus to allocate each calculated resource amount to each of the plurality of operation targets,
wherein the storage apparatus is provided with volumes for each of the plurality of operation targets;
wherein the resource is a cache; and
wherein the credit management unit judges whether or not an IOPS (Input Output Per Second) of each volume provided in the storage apparatus is smaller than a preset IOPS, calculates a credit amount by multiplying the IOPS of the volume which is determined to be smaller, by a conversion coefficient, and adds the calculated credit amount to a credit amount of an operation target associated with the volume; and
if a cache capacity is additionally allocated to a specified operation target via the bursting, the credit management unit calculates a credit amount by multiplying the cache capacity by time during which the cache capacity is additionally allocated, and subtracts the calculated credit amount from the credit amount of the operation target.

* * * * *